US012341301B2

(12) United States Patent
Kirk et al.

(10) Patent No.: US 12,341,301 B2
(45) **Date of Patent: *Jun. 24, 2025**

(54) CONNECTOR CONFIGURABLE FOR HIGH PERFORMANCE

(71) Applicant: Amphenol Corporation, Wallingford, CT (US)

(72) Inventors: Brian Kirk, Amherst, NH (US); Jason Si, Toronto (CA); Ba Pham, Vaughan (CA); Sam Kocsis, Nashua, NH (US); David Chan, Xiamen (CN); Wonder Wang, Xiamen (CN); Bob Tang, Xiamen (CN); Martin Li, Xiamen (CN); Smith Wu, Xiamen (CN)

(73) Assignee: Amphenol Corporation, Wallingford, CT (US)

( * ) Notice: Subject to any disclaimer, the term of this patent is extended or adjusted under 35 U.S.C. 154(b) by 145 days.

This patent is subject to a terminal disclaimer.

(21) Appl. No.: 18/085,093

(22) Filed: Dec. 20, 2022

(65) Prior Publication Data

US 2023/0128519 A1 Apr. 27, 2023

Related U.S. Application Data

(63) Continuation of application No. 17/164,400, filed on Feb. 1, 2021, now Pat. No. 11,539,171, which is a (Continued)

(51) Int. Cl.

*H01R 13/6585* (2011.01)
*H01R 12/72* (2011.01)

(Continued)

(52) U.S. Cl.

CPC ..... *H01R 13/6585* (2013.01); *H01R 13/6473* (2013.01); *H01R 13/6593* (2013.01);

(Continued)

(58) Field of Classification Search

CPC ............ H01R 13/6585; H01R 13/6473; H01R 13/6593; H01R 13/6594; H01R 13/6599; H01R 12/721; H01R 12/724

(Continued)

(56) References Cited

U.S. PATENT DOCUMENTS

| | | |
|---|---|---|
| 2,996,710 A | 8/1961 | Pratt |
| 3,002,162 A | 9/1961 | Garstang |

(Continued)

FOREIGN PATENT DOCUMENTS

| | | |
|---|---|---|
| CN | 1075390 A | 8/1993 |
| CN | 1098549 A | 2/1995 |

(Continued)

OTHER PUBLICATIONS

Taiwanese Office Action dated Nov. 9, 2023 in connection with Taiwanese Application No. 111149147.

(Continued)

*Primary Examiner* — Khiem M Nguyen

(57) ABSTRACT

An electrical connector for high speed signals. The connector has multiple conductive elements that may serve as signal or ground conductors. A member formed with lossy material and conductive compliant members may be inserted in the connector. The conductive compliant members may be aligned with conductive elements of the connector configured as ground conductors. For a connector configured to carry differential signals, the ground conductors may separate pairs of signal conductors. The member may further include a conductive web, embedded within the lossy material, that interconnects the conductive compliant members. For a receptacle connector, the conductive elements may have mating contact portions aligned along opposing surfaces of a cavity. The conductive elements may have contact tails for attachment to a printed circuit board and interme- (Continued)

diate portions connecting the mating contact portions and the contact tails. The conductive compliant members may press against the intermediate portions.

20 Claims, 7 Drawing Sheets

Related U.S. Application Data continuation of application No. 16/716,157, filed on Dec. 16, 2019, now Pat. No. 10,916,894, which is a continuation of application No. 16/362,541, filed on Mar. 22, 2019, now Pat. No. 10,511,128, which is a continuation of application No. 15/683,199, filed on Aug. 22, 2017, now Pat. No. 10,243,304.

(60) Provisional application No. 62/378,244, filed on Aug. 23, 2016.

(51) Int. Cl.
*H01R 13/6473* (2011.01)
*H01R 13/6593* (2011.01)
*H01R 13/6594* (2011.01)
*H01R 13/6599* (2011.01)

(52) U.S. Cl.
CPC ..... *H01R 13/6594* (2013.01); *H01R 13/6599* (2013.01); *H01R 12/721* (2013.01); *H01R 12/724* (2013.01)

(58) Field of Classification Search
USPC ..................................................... 439/607.11
See application file for complete search history.

(56) References Cited

U.S. PATENT DOCUMENTS 3,134,950 A 5/1964 Cook
3,243,756 A 3/1966 Ruete et al.
3,322,885 A 5/1967 May et al.
3,390,369 A 6/1968 Zavertnik et al.
3,390,389 A 6/1968 Bluish
3,505,619 A 4/1970 Bishop
3,573,677 A 4/1971 Detar
3,731,259 A 5/1973 Occhipinti
3,743,978 A 7/1973 Fritz
3,745,509 A 7/1973 Woodward et al.
3,786,372 A 1/1974 Epis et al.
3,825,874 A 7/1974 Peverill
3,848,073 A 11/1974 Simons et al.
3,863,181 A 1/1975 Glance et al.
3,999,830 A 12/1976 Herrmann, Jr. et al.
4,155,613 A 5/1979 Brandeau
4,175,821 A 11/1979 Hunter
4,195,272 A 3/1980 Boutros
4,215,910 A 8/1980 Walter
4,272,148 A 6/1981 Knack, Jr.
4,276,523 A 6/1981 Boutros et al.
4,371,742 A 2/1983 Manly
4,408,255 A 10/1983 Adkins
4,447,105 A 5/1984 Ruehl
4,457,576 A 7/1984 Cosmos et al.
4,471,015 A 9/1984 Ebneth et al.
4,472,765 A 9/1984 Hughes
4,484,159 A 11/1984 Whitley
4,490,283 A 12/1984 Kleiner
4,518,651 A 5/1985 Wolfe, Jr.
4,519,664 A 5/1985 Tillotson
4,519,665 A 5/1985 Althouse et al.
4,571,014 A 2/1986 Robin et al.
4,605,914 A 8/1986 Harman
4,607,907 A 8/1986 Bogursky
4,632,476 A 12/1986 Schell
4,636,752 A 1/1987 Saito
4,655,518 A 4/1987 Johnson et al.
4,674,812 A 6/1987 Thom et al.
4,678,260 A 7/1987 Gallusser et al.
4,682,129 A 7/1987 Bakermans et al.
4,686,607 A 8/1987 Johnson
4,728,762 A 3/1988 Roth et al.
4,737,598 A 4/1988 O'Connor
4,751,479 A 6/1988 Parr
4,761,147 A 8/1988 Gauthier
4,806,107 A 2/1989 Arnold et al.
4,824,383 A 4/1989 Lemke
4,836,791 A 6/1989 Grabbe et al.
4,846,724 A 7/1989 Sasaki et al.
4,846,727 A 7/1989 Glover et al.
4,871,316 A 10/1989 Herrell et al.
4,876,630 A 10/1989 Dara
4,878,155 A 10/1989 Conley
4,889,500 A 12/1989 Lazar et al.
4,902,243 A 2/1990 Davis
4,948,922 A 8/1990 Varadan et al.
4,970,354 A 11/1990 Iwasa et al.
4,971,726 A 11/1990 Maeno et al.
4,975,084 A 12/1990 Fedder et al.
4,984,992 A 1/1991 Beamenderfer et al.
4,992,060 A 2/1991 Meyer
5,000,700 A 3/1991 Masubuchi et al.
5,046,084 A 9/1991 Barrett et al.
5,046,952 A 9/1991 Cohen et al.
5,046,960 A 9/1991 Fedder
5,066,236 A 11/1991 Broeksteeg
5,135,405 A 8/1992 Fusselman et al.
5,141,454 A 8/1992 Garrett et al.
5,150,086 A 9/1992 Ito
5,166,527 A 11/1992 Solymar
5,168,252 A 12/1992 Naito
5,168,432 A 12/1992 Murphy et al.
5,176,538 A 1/1993 Hansell, III et al.
5,190,472 A 3/1993 Voltz et al.
5,246,388 A 9/1993 Collins et al.
5,259,773 A 11/1993 Champion et al.
5,266,055 A 11/1993 Naito et al.
5,280,257 A 1/1994 Cravens et al.
5,281,762 A 1/1994 Long et al.
5,287,076 A 2/1994 Johnescu et al.
5,323,299 A 6/1994 Weber
5,334,050 A 8/1994 Andrews
5,335,146 A 8/1994 Stucke
5,340,334 A 8/1994 Nguyen
5,346,410 A 9/1994 Moore, Jr.
5,352,123 A 10/1994 Sample et al.
5,403,206 A 4/1995 McNamara et al.
5,407,622 A 4/1995 Cleveland et al.
5,429,520 A 7/1995 Morlion et al.
5,429,521 A 7/1995 Morlion et al.
5,433,617 A 7/1995 Morlion et al.
5,433,618 A 7/1995 Morlion et al.
5,456,619 A 10/1995 Belopolsky et al.
5,461,392 A 10/1995 Mott et al.
5,474,472 A 12/1995 Niwa et al.
5,484,310 A 1/1996 McNamara et al.
5,490,372 A 2/1996 Schlueter
5,496,183 A 3/1996 Soes et al.
5,499,935 A 3/1996 Powell
5,539,148 A 7/1996 Konishi et al.
5,551,893 A 9/1996 Johnson
5,554,050 A 9/1996 Marpoe, Jr.
5,562,497 A 10/1996 Yagi et al.
5,564,949 A 10/1996 Wellinsky
5,571,991 A 11/1996 Highum et al.
5,597,328 A 1/1997 Mouissie
5,605,469 A 2/1997 Wellinsky et al.
5,620,340 A 4/1997 Andrews
5,651,702 A 7/1997 Hanning et al.
5,660,551 A 8/1997 Sakurai
5,669,789 A 9/1997 Law
5,702,258 A 12/1997 Provencher et al.
5,755,597 A 5/1998 Panis et al.
5,795,191 A 8/1998 Preputnick et al.

(56) References Cited

U.S. PATENT DOCUMENTS

| | | | |
|---|---|---|---|
| 5,796,323 | A | 8/1998 | Uchikoba et al. |
| 5,803,768 | A | 9/1998 | Zell et al. |
| 5,831,491 | A | 11/1998 | Buer et al. |
| 5,833,486 | A | 11/1998 | Shinozaki |
| 5,833,496 | A | 11/1998 | Hollander et al. |
| 5,842,887 | A | 12/1998 | Andrews |
| 5,870,528 | A | 2/1999 | Fukuda |
| 5,885,095 | A | 3/1999 | Cohen et al. |
| 5,887,158 | A | 3/1999 | Sample et al. |
| 5,904,594 | A | 5/1999 | Longueville et al. |
| 5,924,899 | A | 7/1999 | Paagman |
| 5,931,686 | A | 8/1999 | Sasaki et al. |
| 5,959,591 | A | 9/1999 | Aurand |
| 5,961,355 | A | 10/1999 | Morlion et al. |
| 5,971,809 | A | 10/1999 | Ho |
| 5,980,321 | A | 11/1999 | Cohen et al. |
| 5,981,869 | A | 11/1999 | Kroger |
| 5,982,253 | A | 11/1999 | Perrin et al. |
| 5,993,259 | A | 11/1999 | Stokoe et al. |
| 5,997,361 | A | 12/1999 | Driscoll et al. |
| 6,019,616 | A | 2/2000 | Yagi et al. |
| 6,042,394 | A | 3/2000 | Mitra et al. |
| 6,083,047 | A | 7/2000 | Paagman |
| 6,102,747 | A | 8/2000 | Paagman |
| 6,116,926 | A | 9/2000 | Ortega et al. |
| 6,120,306 | A | 9/2000 | Evans |
| 6,123,554 | A | 9/2000 | Ortega et al. |
| 6,132,255 | A | 10/2000 | Verhoeven |
| 6,132,355 | A | 10/2000 | Derie |
| 6,135,824 | A | 10/2000 | Okabe et al. |
| 6,146,202 | A | 11/2000 | Ramey et al. |
| 6,152,274 | A | 11/2000 | Blard et al. |
| 6,152,742 | A | 11/2000 | Cohen et al. |
| 6,152,747 | A | 11/2000 | McNamara |
| 6,163,464 | A | 12/2000 | Ishibashi et al. |
| 6,168,469 | B1 | 1/2001 | Lu |
| 6,171,115 | B1 | 1/2001 | Mickievicz et al. |
| 6,171,149 | B1 | 1/2001 | van Zanten |
| 6,174,202 | B1 | 1/2001 | Mitra |
| 6,174,203 | B1 | 1/2001 | Asao |
| 6,174,944 | B1 | 1/2001 | Chiba et al. |
| 6,179,651 | B1 | 1/2001 | Huang |
| 6,179,663 | B1 | 1/2001 | Bradley et al. |
| 6,196,853 | B1 | 3/2001 | Harting et al. |
| 6,203,396 | B1 | 3/2001 | Asmussen et al. |
| 6,206,729 | B1 | 3/2001 | Bradley et al. |
| 6,210,182 | B1 | 4/2001 | Elco et al. |
| 6,210,227 | B1 | 4/2001 | Yamasaki et al. |
| 6,217,372 | B1 | 4/2001 | Reed |
| 6,227,875 | B1 | 5/2001 | Wu et al. |
| 6,231,391 | B1 | 5/2001 | Ramey et al. |
| 6,238,245 | B1 | 5/2001 | Stokoe et al. |
| 6,267,604 | B1 | 7/2001 | Mickievicz et al. |
| 6,273,758 | B1 | 8/2001 | Lloyd et al. |
| 6,293,827 | B1 | 9/2001 | Stokoe |
| 6,296,496 | B1 | 10/2001 | Trammel |
| 6,299,438 | B1 | 10/2001 | Sahagian et al. |
| 6,299,483 | B1 | 10/2001 | Cohen et al. |
| 6,299,484 | B2 | 10/2001 | Van Woensel |
| 6,299,492 | B1 | 10/2001 | Pierini et al. |
| 6,328,572 | B1 | 12/2001 | Higashida et al. |
| 6,328,601 | B1 | 12/2001 | Yip et al. |
| 6,333,468 | B1 | 12/2001 | Endoh et al. |
| 6,343,955 | B2 | 2/2002 | Billman et al. |
| 6,343,957 | B1 | 2/2002 | Kuo et al. |
| 6,347,962 | B1 | 2/2002 | Kline |
| 6,350,134 | B1 | 2/2002 | Fogg et al. |
| 6,358,088 | B1 | 3/2002 | Nishio et al. |
| 6,358,092 | B1 | 3/2002 | Siemon et al. |
| 6,364,711 | B1 | 4/2002 | Berg et al. |
| 6,364,713 | B1 | 4/2002 | Kuo |
| 6,375,510 | B2 | 4/2002 | Asao |
| 6,379,188 | B1 | 4/2002 | Cohen et al. |
| 6,380,485 | B1 | 4/2002 | Beaman et al. |
| 6,392,142 | B1 | 5/2002 | Uzuka et al. |
| 6,394,839 | B2 | 5/2002 | Reed |
| 6,396,712 | B1 | 5/2002 | Kuijk |
| 6,398,588 | B1 | 6/2002 | Bickford |
| 6,409,543 | B1 | 6/2002 | Astbury, Jr. et al. |
| 6,413,119 | B1 | 7/2002 | Gabrisko, Jr. et al. |
| 6,428,344 | B1 | 8/2002 | Reed |
| 6,431,914 | B1 | 8/2002 | Billman |
| 6,435,913 | B1 | 8/2002 | Billman |
| 6,435,914 | B1 | 8/2002 | Billman |
| 6,441,313 | B1 | 8/2002 | Novak |
| 6,454,605 | B1 | 9/2002 | Bassler et al. |
| 6,461,202 | B2 | 10/2002 | Kline |
| 6,471,549 | B1 | 10/2002 | Lappohn |
| 6,478,624 | B2 | 11/2002 | Ramey et al. |
| 6,482,017 | B1 | 11/2002 | Van Doorn |
| 6,491,545 | B1 | 12/2002 | Spiegel et al. |
| 6,503,103 | B1 | 1/2003 | Cohen et al. |
| 6,506,076 | B2 | 1/2003 | Cohen et al. |
| 6,517,360 | B1 | 2/2003 | Cohen |
| 6,520,803 | B1 | 2/2003 | Dunn |
| 6,527,587 | B1 | 3/2003 | Ortega et al. |
| 6,528,737 | B1 | 3/2003 | Kwong et al. |
| 6,530,790 | B1 | 3/2003 | McNamara et al. |
| 6,533,613 | B1 | 3/2003 | Turner et al. |
| 6,537,087 | B2 | 3/2003 | McNamara et al. |
| 6,538,524 | B1 | 3/2003 | Miller |
| 6,538,899 | B1 | 3/2003 | Krishnamurthi et al. |
| 6,540,522 | B2 | 4/2003 | Sipe |
| 6,540,558 | B1 | 4/2003 | Paagman |
| 6,540,559 | B1 | 4/2003 | Kemmick et al. |
| 6,541,712 | B1 | 4/2003 | Gately et al. |
| 6,544,072 | B2 | 4/2003 | Olson |
| 6,544,647 | B1 | 4/2003 | Hayashi et al. |
| 6,551,140 | B2 | 4/2003 | Billman et al. |
| 6,554,647 | B1 | 4/2003 | Cohen et al. |
| 6,565,387 | B2 | 5/2003 | Cohen |
| 6,565,390 | B2 | 5/2003 | Wu |
| 6,579,116 | B2 | 6/2003 | Brennan et al. |
| 6,582,244 | B2 | 6/2003 | Fogg et al. |
| 6,585,540 | B2 | 7/2003 | Gutierrez et al. |
| 6,592,381 | B2 | 7/2003 | Cohen et al. |
| 6,595,802 | B1 | 7/2003 | Watanabe et al. |
| 6,602,095 | B2 | 8/2003 | Astbury, Jr. et al. |
| 6,607,402 | B2 | 8/2003 | Cohen et al. |
| 6,608,762 | B2 | 8/2003 | Patriche |
| 6,609,933 | B2 | 8/2003 | Yamasaki |
| 6,612,871 | B1 | 9/2003 | Givens |
| 6,616,482 | B2 | 9/2003 | De La Cruz et al. |
| 6,616,864 | B1 | 9/2003 | Jiang et al. |
| 6,621,373 | B1 | 9/2003 | Mullen et al. |
| 6,652,318 | B1 | 11/2003 | Winings et al. |
| 6,652,319 | B1 | 11/2003 | Billman |
| 6,655,966 | B2 | 12/2003 | Rothermel et al. |
| 6,663,427 | B1 | 12/2003 | Billman et al. |
| 6,663,429 | B1 | 12/2003 | Korsunsky et al. |
| 6,692,272 | B2 | 2/2004 | Lemke et al. |
| 6,705,895 | B2 | 3/2004 | Hasircoglu |
| 6,706,974 | B2 | 3/2004 | Chen et al. |
| 6,709,294 | B1 | 3/2004 | Cohen et al. |
| 6,712,648 | B2 | 3/2004 | Padro et al. |
| 6,713,672 | B1 | 3/2004 | Stickney |
| 6,717,825 | B2 | 4/2004 | Volstorf |
| 6,722,897 | B1 | 4/2004 | Wu |
| 6,741,141 | B2 | 5/2004 | Kormanyos |
| 6,743,057 | B2 | 6/2004 | Davis et al. |
| 6,749,444 | B2 | 6/2004 | Murr et al. |
| 6,762,941 | B2 | 7/2004 | Roth |
| 6,764,341 | B2 | 7/2004 | Lappoehn |
| 6,776,645 | B2 | 8/2004 | Roth et al. |
| 6,776,659 | B1 | 8/2004 | Stokoe et al. |
| 6,786,771 | B2 | 9/2004 | Gailus |
| 6,792,941 | B2 | 9/2004 | Andersson |
| 6,806,109 | B2 | 10/2004 | Furuya et al. |
| 6,808,419 | B1 | 10/2004 | Korsunsky et al. |
| 6,808,420 | B2 | 10/2004 | Whiteman, Jr. et al. |
| 6,814,519 | B2 | 11/2004 | Policicchio et al. |
| 6,814,619 | B1 | 11/2004 | Stokoe et al. |
| 6,816,486 | B1 | 11/2004 | Rogers |
| 6,817,870 | B1 | 11/2004 | Kwong et al. |

(56) References Cited

U.S. PATENT DOCUMENTS 6,823,587 B2 11/2004 Reed
6,830,478 B1 12/2004 Ko et al.
6,830,483 B1 12/2004 Wu
6,830,489 B2 12/2004 Aoyama
6,857,899 B2 2/2005 Reed et al.
6,872,085 B1 3/2005 Cohen et al.
6,875,031 B1 4/2005 Korsunsky et al.
6,899,566 B2 5/2005 Kline et al.
6,903,939 B1 6/2005 Chea, Jr. et al.
6,913,490 B2 7/2005 Whiteman, Jr. et al.
6,932,649 B1 8/2005 Rothermel et al.
6,957,967 B2 10/2005 Petersen et al.
6,960,103 B2 11/2005 Tokunaga
6,971,916 B2 12/2005 Tokunaga
6,979,202 B2 12/2005 Benham et al.
6,979,226 B2 12/2005 Otsu et al.
6,982,378 B2 1/2006 Dickson
7,004,793 B2 2/2006 Scherer et al.
7,021,969 B2 4/2006 Matsunaga
7,044,794 B2 5/2006 Consoli et al.
7,057,570 B2 6/2006 Irion, II et al.
7,074,086 B2 7/2006 Cohen et al.
7,094,102 B2 8/2006 Cohen et al.
7,108,556 B2 9/2006 Cohen et al.
7,120,327 B2 10/2006 Bozso et al.
7,137,849 B2 11/2006 Nagata
7,163,421 B1 1/2007 Cohen et al.
7,182,643 B2 2/2007 Winings et al.
7,229,318 B2 6/2007 Winings et al.
7,261,591 B2 8/2007 Korsunsky et al.
7,270,573 B2 9/2007 Houtz
7,285,018 B2 10/2007 Kenny et al.
7,303,427 B2 12/2007 Swain
7,309,239 B2 12/2007 Shuey et al.
7,309,257 B1 12/2007 Minich
7,316,585 B2 1/2008 Smith et al.
7,322,855 B2 1/2008 Mongold et al.
7,331,830 B2 2/2008 Minich
7,335,063 B2 2/2008 Cohen et al.
7,347,721 B2 3/2008 Kameyama
7,351,114 B2 4/2008 Benham et al.
7,354,274 B2 4/2008 Minich
7,365,269 B2 4/2008 Donazzi et al.
7,371,117 B2 5/2008 Gailus
7,390,218 B2 6/2008 Smith et al.
7,390,220 B1 6/2008 Wu
7,407,413 B2 8/2008 Minich
7,494,383 B2 2/2009 Cohen et al.
7,540,781 B2 6/2009 Kenny et al.
7,554,096 B2 6/2009 Ward et al.
7,581,990 B2 9/2009 Kirk et al.
7,585,186 B2 9/2009 McAlonis et al.
7,588,464 B2 9/2009 Kim
7,588,467 B2 9/2009 Chang
7,594,826 B2 9/2009 Kobayashi et al.
7,604,490 B2 10/2009 Chen et al.
7,604,502 B2 10/2009 Pan
7,674,133 B2 3/2010 Fogg et al.
7,690,946 B2 4/2010 Knaub et al.
7,699,644 B2 4/2010 Szczesny et al.
7,699,663 B1 4/2010 Little et al.
7,722,401 B2 5/2010 Kirk et al.
7,731,537 B2 6/2010 Amleshi et al.
7,753,731 B2 7/2010 Cohen et al.
7,758,357 B2 7/2010 Pan et al.
7,771,233 B2 8/2010 Gailus
7,789,676 B2 9/2010 Morgan et al.
7,794,240 B2 9/2010 Cohen et al.
7,794,278 B2 9/2010 Cohen et al.
7,806,729 B2 10/2010 Nguyen et al.
7,828,595 B2 11/2010 Mathews
7,833,068 B2 11/2010 Bright et al.
7,871,296 B2 1/2011 Fowler et al.
7,874,873 B2 1/2011 Do et al.
7,887,371 B2 2/2011 Kenny et al.
7,887,379 B2 2/2011 Kirk
7,906,730 B2 3/2011 Atkinson et al.
7,914,304 B2 3/2011 Cartier et al.
7,927,143 B2 4/2011 Helster et al.
7,985,097 B2 7/2011 Gulla
8,018,733 B2 9/2011 Jia
8,057,267 B2 11/2011 Johnescu
8,083,553 B2 12/2011 Manter et al.
8,167,631 B2 5/2012 Ito et al.
8,182,289 B2 5/2012 Stokoe et al.
8,215,968 B2 7/2012 Cartier et al.
8,216,001 B2 7/2012 Kirk
8,251,745 B2 8/2012 Johnescu
8,267,721 B2 9/2012 Minich
8,272,877 B2 9/2012 Stokoe et al.
8,328,565 B2 12/2012 Westman et al.
8,348,701 B1 1/2013 Lan et al.
8,371,875 B2 2/2013 Gailus
8,382,524 B2 2/2013 Khilchenko et al.
8,545,240 B2 10/2013 Casher et al.
8,550,861 B2 10/2013 Cohen et al.
8,657,627 B2 2/2014 McNamara et al.
8,678,860 B2 3/2014 Minich et al.
8,715,003 B2 5/2014 Buck et al.
8,715,005 B2 5/2014 Pan
8,764,460 B2 7/2014 Smink et al.
8,764,488 B2 7/2014 Zeng
8,771,016 B2 7/2014 Atkinson et al.
8,864,521 B2 10/2014 Atkinson et al.
8,926,377 B2 1/2015 Kirk et al.
8,944,831 B2 2/2015 Stoner et al.
8,944,863 B1 2/2015 Yang
8,998,642 B2 4/2015 Manter et al.
9,004,942 B2 4/2015 Paniauqa
9,011,177 B2 4/2015 Lloyd et al.
9,022,806 B2 5/2015 Cartier, Jr. et al.
9,028,201 B2 5/2015 Kirk et al.
9,028,281 B2 5/2015 Kirk et al.
9,065,230 B2 6/2015 Milbrand, Jr.
9,077,115 B2 7/2015 Yang
9,083,130 B2 7/2015 Casher et al.
9,124,009 B2 9/2015 Atkinson et al.
9,166,317 B2 10/2015 Briant et al.
9,219,335 B2 12/2015 Atkinson et al.
9,225,083 B2 12/2015 Krenceski et al.
9,225,085 B2 12/2015 Cartier, Jr. et al.
9,257,778 B2 2/2016 Buck et al.
9,257,794 B2 2/2016 Wanha et al.
9,300,074 B2 3/2016 Gailus
9,401,570 B2 7/2016 Phillips et al.
9,450,344 B2 9/2016 Cartier, Jr. et al.
9,461,378 B1 10/2016 Chen
9,484,674 B2 11/2016 Cartier, Jr. et al.
9,490,585 B2 11/2016 Yang
9,490,587 B1 11/2016 Phillips et al.
9,509,101 B2 11/2016 Cartier, Jr. et al.
9,520,689 B2 12/2016 Cartier, Jr. et al.
9,634,432 B2 4/2017 Su et al.
9,692,183 B2 6/2017 Phillips
9,692,188 B2 6/2017 Godana et al.
9,705,218 B2 7/2017 Ito
9,705,255 B2 7/2017 Atkinson et al.
9,742,132 B1 8/2017 Hsueh
9,748,698 B1 8/2017 Morgan et al.
9,831,588 B2 11/2017 Cohen
9,843,135 B2 12/2017 Guetig et al.
9,899,774 B2 2/2018 Gailus
9,923,309 B1 3/2018 Aizawa et al.
9,972,945 B1 5/2018 Huang et al.
9,979,136 B1 5/2018 Wu et al.
9,985,389 B1 5/2018 Morgan et al.
10,038,284 B2 7/2018 Krenceski et al.
10,096,921 B2 10/2018 Johnescu et al.
10,122,129 B2 11/2018 Milbrand, Jr. et al.
10,148,025 B1 12/2018 Trout et al.
10,186,814 B2 1/2019 Khilchenko et al.
10,205,286 B2 2/2019 Provencher et al.
10,211,577 B2 2/2019 Milbrand, Jr. et al.
10,243,304 B2 3/2019 Kirk et al.

(56) References Cited

U.S. PATENT DOCUMENTS 10,270,191 B1 4/2019 Li et al.
10,283,910 B1 5/2019 Chen et al.
10,348,040 B2 7/2019 Cartier, Jr. et al.
10,355,416 B1 7/2019 Pickel et al.
10,381,767 B1 8/2019 Milbrand, Jr. et al.
10,431,936 B2 10/2019 Horning et al.
10,446,983 B2 10/2019 Krenceski et al.
10,511,128 B2 12/2019 Kirk et al.
10,601,181 B2 3/2020 Lu et al.
10,720,735 B2 7/2020 Provencher et al.
10,777,921 B2 9/2020 Lu et al.
10,797,417 B2 10/2020 Scholeno et al.
10,847,936 B2 11/2020 Tang et al.
10,916,894 B2 * 2/2021 Kirk .................. H01R 13/6585
10,931,050 B2 2/2021 Cohen
10,938,162 B2 3/2021 Lin
10,965,063 B2 3/2021 Krenceski et al.
11,189,971 B2 11/2021 Lu
11,251,558 B1 2/2022 Lee
11,316,307 B2 4/2022 Chen et al.
11,381,039 B2 7/2022 Hsiao et al.
11,469,553 B2 10/2022 Johnescu et al.
11,469,554 B2 10/2022 Ellison et al.
11,522,310 B2 12/2022 Cohen
11,539,171 B2 * 12/2022 Kirk .................. H01R 13/6594
11,600,950 B2 3/2023 Takai et al.
11,715,914 B2 8/2023 Cartier, Jr. et al.
11,757,224 B2 9/2023 Milbrand, Jr. et al.
11,799,246 B2 10/2023 Johnescu et al.
11,817,655 B2 11/2023 Liu et al.
11,817,657 B2 11/2023 Ellison et al.
2001/0012730 A1 8/2001 Ramey et al.
2001/0041477 A1 11/2001 Billman et al.
2001/0042632 A1 11/2001 Manov et al.
2001/0046810 A1 11/2001 Cohen et al.
2002/0042223 A1 4/2002 Belopolsky et al.
2002/0086582 A1 7/2002 Nitta et al.
2002/0089464 A1 7/2002 Joshi
2002/0098738 A1 7/2002 Astbury et al.
2002/0102885 A1 8/2002 Kline
2002/0111068 A1 8/2002 Cohen et al.
2002/0111069 A1 8/2002 Astbury et al.
2002/0115335 A1 8/2002 Saito
2002/0123266 A1 9/2002 Ramey et al.
2002/0136506 A1 9/2002 Asada et al.
2002/0146926 A1 10/2002 Fogg et al.
2002/0168898 A1 11/2002 Billman et al.
2002/0172469 A1 11/2002 Benner et al.
2002/0181215 A1 12/2002 Guenthner
2002/0192988 A1 12/2002 Droesbeke et al.
2003/0003803 A1 1/2003 Billman et al.
2003/0008561 A1 1/2003 Lappoehn
2003/0008562 A1 1/2003 Yamasaki
2003/0022555 A1 1/2003 Vicich et al.
2003/0027439 A1 2/2003 Johnescu et al.
2003/0109174 A1 6/2003 Korsunsky et al.
2003/0143894 A1 7/2003 Kline et al.
2003/0147227 A1 8/2003 Egitto et al.
2003/0162441 A1 8/2003 Nelson et al.
2003/0220018 A1 11/2003 Winings et al.
2003/0220021 A1 11/2003 Whiteman et al.
2004/0001299 A1 1/2004 van Haaster et al.
2004/0005815 A1 1/2004 Mizumura et al.
2004/0020674 A1 2/2004 McFadden et al.
2004/0043661 A1 3/2004 Okada et al.
2004/0072473 A1 4/2004 Wu
2004/0097112 A1 5/2004 Minich et al.
2004/0115968 A1 6/2004 Cohen
2004/0121652 A1 6/2004 Gailus
2004/0171305 A1 9/2004 McGowan et al.
2004/0196112 A1 10/2004 Welbon et al.
2004/0224559 A1 11/2004 Nelson et al.
2004/0235352 A1 11/2004 Takemasa
2004/0259419 A1 12/2004 Payne et al.
2005/0006119 A1 1/2005 Cunningham et al.
2005/0020135 A1 1/2005 Whiteman et al.
2005/0039331 A1 2/2005 Smith
2005/0048838 A1 3/2005 Korsunsky et al.
2005/0048842 A1 3/2005 Benham et al.
2005/0070160 A1 3/2005 Cohen et al.
2005/0090299 A1 4/2005 Tsao et al.
2005/0133245 A1 6/2005 Katsuyama et al.
2005/0148239 A1 7/2005 Hull et al.
2005/0176300 A1 8/2005 Hsu et al.
2005/0176835 A1 8/2005 Kobayashi et al.
2005/0215121 A1 9/2005 Tokunaga
2005/0233610 A1 10/2005 Tutt et al.
2005/0277315 A1 12/2005 Mongold et al.
2005/0283974 A1 12/2005 Richard et al.
2005/0287869 A1 12/2005 Kenny et al.
2006/0009080 A1 1/2006 Regnier et al.
2006/0019517 A1 1/2006 Raistrick et al.
2006/0019538 A1 1/2006 Davis et al.
2006/0024983 A1 2/2006 Cohen et al.
2006/0024984 A1 2/2006 Cohen et al.
2006/0068640 A1 3/2006 Gailus
2006/0073709 A1 4/2006 Reid
2006/0104010 A1 5/2006 Donazzi et al.
2006/0110977 A1 5/2006 Matthews
2006/0141866 A1 6/2006 Shiu
2006/0166551 A1 7/2006 Korsunsky et al.
2006/0216969 A1 9/2006 Bright et al.
2006/0255876 A1 11/2006 Kushta et al.
2006/0292932 A1 12/2006 Benham et al.
2007/0004282 A1 1/2007 Cohen et al.
2007/0004828 A1 1/2007 Khabbaz
2007/0021000 A1 1/2007 Laurx
2007/0021001 A1 1/2007 Laurx et al.
2007/0021002 A1 1/2007 Laurx et al.
2007/0021003 A1 1/2007 Laurx et al.
2007/0021004 A1 1/2007 Laurx et al.
2007/0037419 A1 2/2007 Sparrowhawk
2007/0042639 A1 2/2007 Manter et al.
2007/0054554 A1 3/2007 Do et al.
2007/0059961 A1 3/2007 Cartier et al.
2007/0111597 A1 5/2007 Kondou et al.
2007/0141872 A1 6/2007 Szczesny et al.
2007/0155241 A1 7/2007 Lappohn
2007/0218765 A1 9/2007 Cohen et al.
2007/0275583 A1 11/2007 McNutt et al.
2008/0050968 A1 2/2008 Chang
2008/0194146 A1 8/2008 Gailus
2008/0246555 A1 10/2008 Kirk et al.
2008/0248658 A1 10/2008 Cohen et al.
2008/0248659 A1 10/2008 Cohen et al.
2008/0248660 A1 10/2008 Kirk et al.
2008/0318455 A1 12/2008 Beaman et al.
2009/0011641 A1 1/2009 Cohen et al.
2009/0011643 A1 1/2009 Amleshi et al.
2009/0011645 A1 1/2009 Laurx et al.
2009/0029602 A1 1/2009 Cohen et al.
2009/0035955 A1 2/2009 McNamara
2009/0061661 A1 3/2009 Shuey et al.
2009/0117386 A1 5/2009 Vacanti et al.
2009/0124101 A1 5/2009 Minich et al.
2009/0149045 A1 6/2009 Chen et al.
2009/0203259 A1 8/2009 Nguyen et al.
2009/0239395 A1 9/2009 Cohen et al.
2009/0258516 A1 10/2009 Hiew et al.
2009/0291593 A1 11/2009 Atkinson et al.
2009/0305530 A1 12/2009 Ito et al.
2009/0305533 A1 12/2009 Feldman et al.
2009/0305553 A1 12/2009 Thomas et al.
2010/0048058 A1 2/2010 Morgan et al.
2010/0081302 A1 4/2010 Atkinson et al.
2010/0099299 A1 4/2010 Moriyama et al.
2010/0144167 A1 6/2010 Fedder et al.
2010/0273359 A1 10/2010 Walker et al.
2010/0291806 A1 11/2010 Minich et al.
2010/0294530 A1 11/2010 Atkinson et al.
2011/0003509 A1 1/2011 Gailus
2011/0067237 A1 3/2011 Cohen et al.
2011/0104948 A1 5/2011 Girard, Jr. et al.
2011/0130038 A1 6/2011 Cohen et al.

(56) References Cited

U.S. PATENT DOCUMENTS

| | | | |
|---|---|---|---|
| 2011/0212649 | A1 | 9/2011 | Stokoe et al. |
| 2011/0212650 | A1 | 9/2011 | Amleshi et al. |
| 2011/0230095 | A1 | 9/2011 | Atkinson et al. |
| 2011/0230096 | A1 | 9/2011 | Atkinson et al. |
| 2011/0256739 | A1 | 10/2011 | Toshiyuki et al. |
| 2011/0287663 | A1 | 11/2011 | Gailus et al. |
| 2012/0077380 | A1 | 3/2012 | Minich et al. |
| 2012/0094536 | A1 | 4/2012 | Khilchenko et al. |
| 2012/0115371 | A1 | 5/2012 | Chuang et al. |
| 2012/0156929 | A1 | 6/2012 | Manter et al. |
| 2012/0184154 | A1 | 7/2012 | Frank et al. |
| 2012/0202363 | A1 | 8/2012 | McNamara et al. |
| 2012/0202386 | A1 | 8/2012 | McNamara et al. |
| 2012/0202387 | A1 | 8/2012 | McNamara |
| 2012/0214343 | A1 | 8/2012 | Buck et al. |
| 2012/0214344 | A1 | 8/2012 | Cohen et al. |
| 2013/0012038 | A1 | 1/2013 | Kirk et al. |
| 2013/0017733 | A1 | 1/2013 | Kirk et al. |
| 2013/0065454 | A1 | 3/2013 | Milbrand Jr. |
| 2013/0078870 | A1 | 3/2013 | Milbrand, Jr. |
| 2013/0078871 | A1 | 3/2013 | Milbrand, Jr. |
| 2013/0090001 | A1 | 4/2013 | Kagotani |
| 2013/0109232 | A1 | 5/2013 | Paniaqua |
| 2013/0143442 | A1 | 6/2013 | Cohen et al. |
| 2013/0196553 | A1 | 8/2013 | Gailus |
| 2013/0217263 | A1 | 8/2013 | Pan |
| 2013/0225006 | A1 | 8/2013 | Khilchenko et al. |
| 2013/0237092 | A1 | 9/2013 | Rubens |
| 2013/0273781 | A1 | 10/2013 | Buck et al. |
| 2013/0288513 | A1 | 10/2013 | Masubuchi et al. |
| 2013/0316590 | A1 | 11/2013 | Hon |
| 2013/0340251 | A1 | 12/2013 | Regnier et al. |
| 2014/0004724 | A1 | 1/2014 | Cartier, Jr. et al. |
| 2014/0004726 | A1 | 1/2014 | Cartier, Jr. et al. |
| 2014/0004746 | A1 | 1/2014 | Cartier, Jr. et al. |
| 2014/0057498 | A1 | 2/2014 | Cohen |
| 2014/0273557 | A1 | 9/2014 | Cartier, Jr. et al. |
| 2014/0273627 | A1 | 9/2014 | Cartier, Jr. et al. |
| 2015/0056856 | A1 | 2/2015 | Atkinson et al. |
| 2015/0111427 | A1 | 4/2015 | Wu et al. |
| 2015/0188250 | A1 | 7/2015 | Liu et al. |
| 2015/0236451 | A1 | 8/2015 | Cartier, Jr. et al. |
| 2015/0236452 | A1 | 8/2015 | Cartier, Jr. et al. |
| 2015/0255926 | A1 | 9/2015 | Paniagua |
| 2015/0380868 | A1 | 12/2015 | Chen et al. |
| 2016/0000616 | A1 | 1/2016 | Lavoie |
| 2016/0134057 | A1 | 5/2016 | Buck et al. |
| 2016/0149343 | A1 | 5/2016 | Atkinson et al. |
| 2016/0156133 | A1 | 6/2016 | Masubuchi et al. |
| 2016/0172794 | A1 | 6/2016 | Sparrowhawk et al. |
| 2016/0211618 | A1 | 7/2016 | Gailus |
| 2017/0352970 | A1 | 12/2017 | Liang et al. |
| 2018/0062323 | A1 | 3/2018 | Kirk et al. |
| 2018/0109043 | A1 | 4/2018 | Provencher et al. |
| 2018/0145438 | A1 | 5/2018 | Cohen |
| 2018/0166828 | A1 | 6/2018 | Gailus |
| 2018/0198220 | A1 | 7/2018 | Sasame et al. |
| 2018/0205177 | A1 | 7/2018 | Zhou et al. |
| 2018/0212376 | A1 | 7/2018 | Wang et al. |
| 2018/0219331 | A1 | 8/2018 | Cartier, Jr. et al. |
| 2018/0269607 | A1 | 9/2018 | Wu et al. |
| 2019/0036256 | A1 | 1/2019 | Martens et al. |
| 2019/0052019 | A1 | 2/2019 | Huang et al. |
| 2019/0067854 | A1 | 2/2019 | Ju et al. |
| 2019/0131743 | A1 | 5/2019 | Hsu et al. |
| 2019/0173209 | A1 | 6/2019 | Lu et al. |
| 2019/0173232 | A1 | 6/2019 | Lu et al. |
| 2019/0221973 | A1 | 7/2019 | Kirk et al. |
| 2019/0312389 | A1 | 10/2019 | Little |
| 2019/0334292 | A1 | 10/2019 | Cartier, Jr. et al. |
| 2020/0021052 | A1 | 1/2020 | Milbrand, Jr. et al. |
| 2020/0076132 | A1 | 3/2020 | Yang et al. |
| 2020/0161811 | A1 | 5/2020 | Lu |
| 2020/0194940 | A1 | 6/2020 | Cohen et al. |
| 2020/0212632 | A1 | 7/2020 | Liong et al. |
| 2020/0220289 | A1 | 7/2020 | Scholeno et al. |
| 2020/0235529 | A1 | 7/2020 | Kirk et al. |
| 2020/0251841 | A1 | 8/2020 | Stokoe et al. |
| 2020/0259294 | A1 | 8/2020 | Lu |
| 2020/0266584 | A1 | 8/2020 | Lu |
| 2020/0266585 | A1 | 8/2020 | Paniagua et al. |
| 2020/0315027 | A1 | 10/2020 | Muronoi et al. |
| 2020/0350717 | A1 | 11/2020 | Dong et al. |
| 2020/0350732 | A1 | 11/2020 | Hsueh et al. |
| 2020/0395698 | A1 | 12/2020 | Hou et al. |
| 2020/0403350 | A1 | 12/2020 | Hsu |
| 2020/0412060 | A1 | 12/2020 | Hsieh et al. |
| 2021/0036465 | A1 | 2/2021 | Tang et al. |
| 2021/0050683 | A1 | 2/2021 | Sasame et al. |
| 2021/0159643 | A1 | 5/2021 | Kirk et al. |
| 2021/0175670 | A1 | 6/2021 | Cartier, Jr. et al. |
| 2021/0194187 | A1 | 6/2021 | Chen et al. |
| 2021/0203096 | A1 | 7/2021 | Cohen |
| 2021/0234314 | A1 | 7/2021 | Johnescu et al. |
| 2021/0234315 | A1 | 7/2021 | Ellison et al. |
| 2021/0242632 | A1 | 8/2021 | Trout et al. |
| 2021/0320461 | A1 | 10/2021 | Buck et al. |
| 2021/0336362 | A1 | 10/2021 | Shen et al. |
| 2022/0094099 | A1 | 3/2022 | Liu et al. |
| 2022/0102916 | A1 | 3/2022 | Liu et al. |
| 2022/0399663 | A1 | 12/2022 | Chang et al. |
| 2022/0407269 | A1 | 12/2022 | Ellison et al. |
| 2023/0062661 | A1 | 3/2023 | Johnescu et al. |
| 2023/0099389 | A1 | 3/2023 | Cohen |
| 2023/0378695 | A1 | 11/2023 | Zeng |

FOREIGN PATENT DOCUMENTS

| | | | |
|---|---|---|---|
| CN | 1237652 | A | 12/1999 |
| CN | 1265470 | A | 9/2000 |
| CN | 2400938 | Y | 10/2000 |
| CN | 1276597 | A | 12/2000 |
| CN | 1280405 | A | 1/2001 |
| CN | 1299524 | A | 6/2001 |
| CN | 2513247 | Y | 9/2002 |
| CN | 2519434 | Y | 10/2002 |
| CN | 2519458 | Y | 10/2002 |
| CN | 2519592 | Y | 10/2002 |
| CN | 1394829 | A | 2/2003 |
| CN | 1398446 | A | 2/2003 |
| CN | 1401147 | A | 3/2003 |
| CN | 1471749 | A | 1/2004 |
| CN | 1489810 | A | 4/2004 |
| CN | 1491465 | A | 4/2004 |
| CN | 1502151 | A | 6/2004 |
| CN | 1516723 | A | 7/2004 |
| CN | 1179448 | C | 12/2004 |
| CN | 1561565 | A | 1/2005 |
| CN | 1203341 | C | 5/2005 |
| CN | 1639866 | A | 7/2005 |
| CN | 1650479 | A | 8/2005 |
| CN | 1764020 | A | 4/2006 |
| CN | 1799290 | A | 7/2006 |
| CN | 2798361 | Y | 7/2006 |
| CN | 2865050 | Y | 1/2007 |
| CN | 1985199 | A | 6/2007 |
| CN | 101032060 | A | 9/2007 |
| CN | 201000949 | Y | 1/2008 |
| CN | 101124697 | A | 2/2008 |
| CN | 101176389 | A | 5/2008 |
| CN | 101208837 | A | 6/2008 |
| CN | 101273501 | A | 9/2008 |
| CN | 201112782 | Y | 9/2008 |
| CN | 101312275 | A | 11/2008 |
| CN | 101316012 | A | 12/2008 |
| CN | 201222548 | Y | 4/2009 |
| CN | 201252183 | Y | 6/2009 |
| CN | 101552410 | A | 10/2009 |
| CN | 101600293 | A | 12/2009 |
| CN | 201374433 | Y | 12/2009 |
| CN | 101752700 | A | 6/2010 |
| CN | 101790818 | A | 7/2010 |
| CN | 101120490 | B | 11/2010 |
| CN | 101964463 | A | 2/2011 |

(56) References Cited

FOREIGN PATENT DOCUMENTS

| | | | |
|---|---|---|---|
| CN | 101124697 | B | 3/2011 |
| CN | 201846527 | U | 5/2011 |
| CN | 102106041 | A | 6/2011 |
| CN | 102195173 | A | 9/2011 |
| CN | 102232259 | A | 11/2011 |
| CN | 102239605 | A | 11/2011 |
| CN | 102282731 | A | 12/2011 |
| CN | 102292881 | A | 12/2011 |
| CN | 101600293 | B | 5/2012 |
| CN | 102570100 | A | 7/2012 |
| CN | 102598430 | A | 7/2012 |
| CN | 101258649 | B | 9/2012 |
| CN | 102738621 | A | 10/2012 |
| CN | 102176586 | B | 11/2012 |
| CN | 102859805 | A | 1/2013 |
| CN | 102882097 | A | 1/2013 |
| CN | 202695788 | U | 1/2013 |
| CN | 202695861 | U | 1/2013 |
| CN | 102986091 | A | 3/2013 |
| CN | 103036081 | A | 4/2013 |
| CN | 103594871 | A | 2/2014 |
| CN | 204190038 | U | 3/2015 |
| CN | 104577577 | A | 4/2015 |
| CN | 205212085 | U | 5/2016 |
| CN | 102820589 | B | 8/2016 |
| CN | 106099546 | A | 11/2016 |
| CN | 107069274 | A | 8/2017 |
| CN | 107069293 | A | 8/2017 |
| CN | 304240766 | S | 8/2017 |
| CN | 304245430 | S | 8/2017 |
| CN | 206712089 | U | 12/2017 |
| CN | 207677189 | U | 7/2018 |
| CN | 108832338 | A | 11/2018 |
| CN | 109994892 | A | 7/2019 |
| CN | 111555069 | A | 8/2020 |
| CN | 112134095 | A | 12/2020 |
| CN | 213636403 | U | 7/2021 |
| DE | 4109863 | A1 | 10/1992 |
| DE | 4238777 | A1 | 5/1993 |
| DE | 19853837 | C1 | 2/2000 |
| DE | 102006044479 | A1 | 5/2007 |
| DE | 60216728 | T2 | 11/2007 |
| EP | 0560551 | A1 | 9/1993 |
| EP | 0774807 | A2 | 5/1997 |
| EP | 0903816 | A2 | 3/1999 |
| EP | 1018784 | A1 | 7/2000 |
| EP | 1779472 | A1 | 5/2007 |
| EP | 1794845 | A1 | 6/2007 |
| EP | 2169770 | A2 | 3/2010 |
| EP | 2262061 | A1 | 12/2010 |
| EP | 2388867 | A2 | 11/2011 |
| EP | 2405537 | A1 | 1/2012 |
| EP | 1794845 | B1 | 3/2013 |
| GB | 1272347 | A | 4/1972 |
| GB | 2161658 | A | 1/1986 |
| GB | 2283620 | A | 5/1995 |
| HK | 1043254 | A1 | 9/2002 |
| JP | H05-54201 | A | 3/1993 |
| JP | H05-234642 | A | 9/1993 |
| JP | H07-57813 | A | 3/1995 |
| JP | H07-302649 | A | 11/1995 |
| JP | H09-63703 | A | 3/1997 |
| JP | H09-274969 | A | 10/1997 |
| JP | 2711601 | B2 | 2/1998 |
| JP | H11-67367 | A | 3/1999 |
| JP | 2896836 | B2 | 5/1999 |
| JP | H11-233200 | A | 8/1999 |
| JP | H11-260497 | A | 9/1999 |
| JP | 2000-013081 | A | 1/2000 |
| JP | 2000-311749 | A | 11/2000 |
| JP | 2001-068888 | A | 3/2001 |
| JP | 2001-510627 | A | 7/2001 |
| JP | 2001-217052 | A | 8/2001 |
| JP | 2002-042977 | A | 2/2002 |
| JP | 2002-053757 | A | 2/2002 |

| | | | |
|---|---|---|---|
| JP | 2002-075052 | A | 3/2002 |
| JP | 2002-075544 | A | 3/2002 |
| JP | 2002-117938 | A | 4/2002 |
| JP | 2002-246107 | A | 8/2002 |
| JP | 2003-017193 | A | 1/2003 |
| JP | 2003-309395 | A | 10/2003 |
| JP | 2004-192939 | A | 7/2004 |
| JP | 2004-259621 | A | 9/2004 |
| JP | 3679470 | B2 | 8/2005 |
| JP | 2006-344524 | A | 12/2006 |
| JP | 2008-515167 | A | 5/2008 |
| JP | 2009-043717 | A | 2/2009 |
| JP | 2009-110956 | A | 5/2009 |
| MX | 9907324 | A1 | 8/2000 |
| TW | 466650 | B | 12/2001 |
| TW | 517002 | B | 1/2003 |
| TW | 534494 | U | 5/2003 |
| TW | 200501874 | A | 1/2005 |
| TW | 200515773 | A | 5/2005 |
| TW | M274675 | U | 9/2005 |
| TW | M329891 | U | 4/2008 |
| TW | M357771 | U | 5/2009 |
| TW | 200926536 | A | 6/2009 |
| TW | M403141 | U | 5/2011 |
| TW | M494411 | U | 1/2015 |
| TW | I475770 | B | 3/2015 |
| TW | M509998 | U | 10/2015 |
| TW | M518837 | U | 3/2016 |
| TW | M558481 | U | 4/2018 |
| TW | M558482 | U | 4/2018 |
| TW | M558483 | U | 4/2018 |
| TW | M559006 | U | 4/2018 |
| TW | M559007 | U | 4/2018 |
| TW | M560138 | U | 5/2018 |
| TW | 201820724 | A | 6/2018 |
| TW | M562507 | U | 6/2018 |
| TW | M565894 | Y | 8/2018 |
| TW | M565895 | Y | 8/2018 |
| TW | M565899 | Y | 8/2018 |
| TW | M565900 | Y | 8/2018 |
| TW | M565901 | Y | 8/2018 |
| TW | M623128 | U | 2/2022 |
| WO | WO 85/02265 | A1 | 5/1985 |
| WO | WO 88/05218 | A1 | 7/1988 |
| WO | WO 98/35409 | A1 | 8/1998 |
| WO | WO 01/39332 | A1 | 5/2001 |
| WO | WO 01/57963 | A2 | 8/2001 |
| WO | WO 2002/061892 | A1 | 8/2002 |
| WO | WO 03/013199 | A2 | 2/2003 |
| WO | WO 03/047049 | A1 | 6/2003 |
| WO | WO 2004/034539 | A1 | 4/2004 |
| WO | WO 2004/051809 | A2 | 6/2004 |
| WO | WO 2004/059794 | A2 | 7/2004 |
| WO | WO 2004/059801 | A1 | 7/2004 |
| WO | WO 2004/114465 | A2 | 12/2004 |
| WO | WO 2005/011062 | A2 | 2/2005 |
| WO | WO 2005/114274 | A1 | 12/2005 |
| WO | WO 2006/039277 | A1 | 4/2006 |
| WO | WO 2007/005597 | A2 | 1/2007 |
| WO | WO 2007/005598 | A2 | 1/2007 |
| WO | WO 2007/005599 | A1 | 1/2007 |
| WO | WO 2008/124052 | A2 | 10/2008 |
| WO | WO 2008/124054 | A2 | 10/2008 |
| WO | WO 2008/124057 | A2 | 10/2008 |
| WO | WO 2008/124101 | A2 | 10/2008 |
| WO | WO 2009/111283 | A2 | 9/2009 |
| WO | WO 2010/030622 | A1 | 3/2010 |
| WO | WO 2010/039188 | A1 | 4/2010 |
| WO | WO 2011/060236 | A1 | 5/2011 |
| WO | WO 2011/100740 | A2 | 8/2011 |
| WO | WO 2011/106572 | A2 | 9/2011 |
| WO | WO 2011/139946 | A1 | 11/2011 |
| WO | WO 2011/140438 | A2 | 11/2011 |
| WO | WO 2011/140438 | A3 | 12/2011 |
| WO | WO 2012/106554 | A2 | 8/2012 |
| WO | WO 2013/059317 | A1 | 4/2013 |
| WO | WO 2015/112717 | A1 | 7/2015 |

(56) References Cited

FOREIGN PATENT DOCUMENTS

WO WO 2016/008473 A1 1/2016
WO WO 2018/039164 A1 3/2018

OTHER PUBLICATIONS

Cartier et al., High Speed, High Density Electrical Connector With Shielded Signal Paths, U.S. Appl. No. 18/335,472, filed Jun. 15, 2023.
Johnescu et al., High Speed Connector, U.S. Appl. No. 18/465,351, filed Sep. 12, 2023.
Milbrand et al., High Performance Cable Connector, U.S. Appl. No. 18/449,520, filed Aug. 14, 2023.
Chinese Invalidation Request dated Aug. 17, 2021 in connection with Chinese Application No. 200580040906.5.
Chinese Invalidation Request dated Jun. 1, 2021 in connection with Chinese Application No. 200680023997.6.
Chinese Invalidation Request dated Sep. 9, 2021 in connection with Chinese Application No. 201110008089.2.
Chinese Invalidation Request dated Jun. 15, 2021 in connection with Chinese Application No. 201180033750.3.
Chinese Supplemental Observations dated Jun. 17, 2021 in connection with Chinese Application No. 201210249710.9.
Chinese communication for Chinese Application No. 201580014851.4, dated Jun. 1, 2020.
Chinese Office Action for Chinese Application No. 201580014851.4 dated Sep. 4, 2019.
Chinese Invalidation Request dated Mar. 17, 2021 in connection with Chinese Application No. 201610952606.4.
Chinese Office Action for Chinese Application No. 201780064531.9 dated Jan. 2, 2020.
Chinese Office Action for Chinese Application No. 202010467444.1 dated Apr. 2, 2021.
Chinese Office Action for Chinese Application No. 202010825662.8 dated Sep. 3, 2021.
Chinese Office Action for Chinese Application No. 202010922401.8 dated Aug. 6, 2021.
Extended European Search Report for European Application No. EP 11166820.8 dated Jan. 24, 2012.
International Search Report and Written Opinion mailed Dec. 28, 2021 in connection with International Application No. PCT/CN2021/119849.
International Preliminary Report on Patentability for International Application No. PCT/US2005/034605 dated Apr. 3, 2007.
International Search Report and Written Opinion for International Application No. PCT/US2005/034605 mailed Jan. 26, 2006.
International Preliminary Report on Patentability for International Application No. PCT/US2006/025562 dated Jan. 9, 2008.
International Search Report with Written Opinion for International Application No. PCT/US2006/025562 mailed Oct. 31, 2007.
International Preliminary Report on Patentability for International Application No. PCT/US2010/056482 mailed May 24, 2012.
International Search Report and Written Opinion for International Application No. PCT/US2010/056482 mailed Mar. 14, 2011.
International Preliminary Report on Patentability for International Application No. PCT/US2011/026139 mailed Sep. 7, 2012.
International Search Report and Written Opinion for International Application No. PCT/US2011/026139 mailed Nov. 22, 2011.
International Search Report and Written Opinion for International Application No. PCT/US2011/034747 mailed Jul. 28, 2011.
International Preliminary Report on Patentability for International Application No. PCT/US2012/023689 mailed Aug. 15, 2013.
International Search Report and Written Opinion for International Application No. PCT/US2012/023689 mailed Sep. 12, 2012.
International Preliminary Report on Patentability for International Application No. PCT/US2012/060610 mailed May 1, 2014.
International Search Report and Written Opinion for International Application No. PCT/US2012/060610 mailed Mar. 29, 2013.
International Preliminary Report on Patentability for International Application No. PCT/US2015/012463 mailed Aug. 4, 2016.
International Search Report and Written Opinion for International Application No. PCT/US2015/012463 mailed May 13, 2015.
International Preliminary Report on Patentability for International Application No. PCT/US2017/047905, mailed Mar. 7, 2019.
International Search Report and Written Opinion for International Application No. PCT/US2017/047905 dated Dec. 4, 2017.
International Preliminary Report on Patentability Chapter II mailed Apr. 5, 2022 in connection with International Application No. PCT/US2021/015048.
International Search Report and Written Opinion mailed Jul. 1, 2021 in connection with International Application No. PCT/US2021/015048.
International Preliminary Report on Patentability Chapter II mailed Apr. 1, 2022 in connection with International Application No. PCT/US2021/015073.
International Search Report and Written Opinion mailed May 17, 2021 in connection with International Application No. PCT/US2021/015073.
Taiwanese Office Action dated Mar. 5, 2021 in connection with Taiwanese Application No. 106128439.
Taiwanese Office Action dated Mar. 15, 2022 in connection with Taiwanese Application No. 110140608.
Decision Invalidating CN Patent Application No. 201610952606.4, which issued as CN Utility Model Patent No. 107069274B, and Certified Translation.
In re Certain Electrical Connectors and Cages, Components Thereof, and Prods. Containing the Same, Inv. No. 337-TA-1241, Order No. 31 (Oct. 19, 2021): Construing Certain Terms of the Asserted Claims of the Patents at Issue.
In re Matter of Certain Electrical Connectors and Cages, Components Thereof, and Products Containing the Same, Inv. No. 337-TA-1241, Complainant Amphenol Corporation's Corrected Initial Post-Hearing Brief. Public Version. Jan. 5, 2022. 451 pages.
In re Matter of Certain Electrical Connectors and Cages, Components Thereof, and Products Containing the Same, Inv. No. 337-TA-1241, Complainant Amphenol Corporation's Post-Hearing Reply Brief. Public Version. Dec. 6, 2021. 159 pages.
In re Matter of Certain Electrical Connectors and Cages, Components Thereof, and Products Containing the Same, Inv. No. 337-TA-1241, Luxshare Respondents' Initial Post-Hearing Brief. Public Version. Nov. 23, 2021. 348 pages.
In re Matter of Certain Electrical Connectors and Cages, Components Thereof, and Products Containing the Same, Inv. No. 337-TA-1241, Luxshare Respondents' Reply Post-Hearing Brief. Public Version. Dec. 6, 2021. 165 pages.
In re Matter of Certain Electrical Connectors and Cages, Components Thereof, and Products Containing the Same, Inv. No. 337-TA-1241, Notice of Prior Art. Jun. 3, 2021. 319 pages.
In re Matter of Certain Electrical Connectors and Cages, Components Thereof, and Products Containing the Same, Inv. No. 337-TA-1241, Respondents' Pre-Hearing Brief. Redacted. Oct. 21, 2021. 219 pages.
In the Matter of Certain Electrical Connectors and Cages, Components Thereof, and Products Containing the Same, Inv. No. 337-TA-1241, Final Initial Determination on Violation of Section 337. Public Version. Mar. 11, 2022. 393 pages.
Invalidity Claim Charts Based on CN 201112782Y ("Cai"). Luxshare Respondents' Supplemental Responses to Interrogatories Nos. 13 and 14, Exhibit 25. May 7, 2021. 147 pages.
Invalidity Claim Charts Based on U.S. Pat. No. 6,179,651 ("Huang"). Luxshare Respondents' Supplemental Responses to Interrogatories Nos. 13 and 14, Exhibit 26. May 7, 2021. 153 pages.
Invalidity Claim Charts Based on U.S. Pat. No. 7,261,591 ("Korsunsky"). Luxshare Respondents' Supplemental Responses to Interrogatories Nos. 13 and 14, Exhibit 27. May 7, 2021. 150 pages.
Petition for Inter Partes Review. *Luxshare Precision Industry Co., Ltd* v. *Amphenol Corp*. U.S. Pat. No. 10,381,767. IPR2022-00132. Nov. 4, 2021. 112 pages.

(56) References Cited

OTHER PUBLICATIONS

[No Author Listed], All About ESD Plastics. Evaluation Engineering. Jul. 1, 1998. 8 pages. https://www.evaluationengineering.com/home/article/13001136/all-about-esdplastics [last accessed Mar. 14, 2021].
[No Author Listed], AMP Incorporated Schematic, Cable Assay, 2 Pair, HMZD. Oct. 3, 2002. 1 page.
[No Author Listed], Board to Backplane Electrical Connector. The Engineer. Mar. 13, 2001, [last accessed Apr. 30, 2021]. 2 pages.
[No Author Listed], Borosil Vision Mezzo Mug Set of 2. Zola. 3 pages. https://www.zola.com/shop/product/borosil_vision_mezzao_mug_setof2_3.25. [date retrieved May 4, 2021].
[No Author Listed], Cable Systems. Samtec. Aug. 2010. 148 pages.
[No Author Listed], Carbon Nanotubes for Electromagnetic Interference Shielding. SBIR/STTR. Award Information. Program Year 2001. Fiscal Year 2001. Materials Research Institute, LLC. Chu et al. Available at http://sbir.gov/sbirsearch/detail/225895. Last accessed Sep. 19, 2013.
[No Author Listed], Coating Electrical Contacts. Brush Wellman Engineered Materials. Jan. 2002;4(1). 2 pages.
[No Author Listed], Common Management Interface Specification. Rev 4.0. MSA Group. May 8, 2019. 265 pages.
[No Author Listed], Electronics Connector Overview. FCI. Sep. 23, 2009. 78 pages.
[No Author Listed], EMI Shielding Compounds Instead of M et al. RTP Company. Last Accessed Apr. 30, 2021. 2 pages.
[No Author Listed], EMI Shielding Solutions and EMC Testing Services from Laird Technologies. Laird Technologies. Last acessed Apr. 30, 2021. 1 page.
[No Author Listed], EMI Shielding, Dramatic Cost Reductions for Electronic Device Protection. RTP. Jan. 2000. 10 pages.
[No Author Listed], Excerpt from The Concise Oxford Dictionary, Tenth Edition. 1999. 3 pages.
[No Author Listed], Excerpt from The Merriam-Webster Dictionary, Between. 2005. 4 pages.
[No Author Listed], Excerpt from Webster's Third New International Dictionary, Contact. 1986. 3 pages.
[No Author Listed], FCI—High Speed Interconnect Solutions, Backpanel Connectors. FCI. [last accessed Apr. 30, 2021). 2 pages.
[No Author Listed], General Product Specification for GbX Backplane and Daughtercard Interconnect System. Revision "B". Teradyne. Aug. 23, 2005. 12 pages.
[No Author Listed], High Speed Backplane Connectors . Tyco Electronics. Product Catalog No. 1773095. Revised Dec. 2008. 1-40 pages.
[No Author Listed], Hozox EMI Absorption Sheet and Tape. Molex. Laird Technologies. 2013. 2 pages.
[No Author Listed], INF-8074i Specification for SFP (Small Formfactor Pluggable) Transceiver. SFF Committee. Revision 1.0. May 12, 2001. 39 pages.
[No Author Listed], INF-8438i Specification for QSFP (Quad Small Formfactor Pluggable) Transceiver. Rev 1.0 Nov. 2006. SFF Committee. 76 pages.
[No Author Listed], Interconnect Signal Integrity Handbook. Samtec. Aug. 2007. 21 pages.
[No Author Listed], Metallized Conductive Products: Fabric-Over-Foam, Conductive Foam, Fabric, Tape. Laird Technologies. 2003. 32 pages.
[No Author Listed], Metral® 2000 Series. FCI. 2001. 2 pages.
[No Author Listed], Metral® 2mm High-Speed Connectors 1000, 2000, 3000 Series. FCI. 2000. 119 pages.
[No Author Listed], Metral® 3000 Series. FCI. 2001. 2 pages.
[No Author Listed], Metral® 4000 Series. FCI. 2002. 2 pages.
[No Author Listed], Metral® 4000 Series: High-Speed Backplane Connectors. FCI, Rev. 3. Nov. 30, 2001. 21 pages.
[No Author Listed], Military Fibre Channel High Speed Cable Assembly. www.gore.com. 2008. [last accessed Aug. 2, 2012 via Internet Archive: Wayback Machine http://web.archive.org] Link archived: http://www.gore.com/en.sub.--xx/products/cables/copper/networking/militar-y/military.sub.--fibre . . . Last archive date Apr. 6, 2008.
[No Author Listed], Molex Connectors as InfiniBand Solutions. Design World. Nov. 19, 2008. 7 pages. https://www.designworldonline.com/molex-connectors-as-infiniband-solutions/. [last accessed May 3, 2021].
[No Author Listed], OSFP MSA Specification for OSFP Octal Small Form Factor Pluggable Module. Revision 1.11. OSFP MSA. Jun. 26, 2017. 53 pages.
[No Author Listed], OSFP MSA Specification for OSFP Octal Small Form Factor Pluggable Module. Revision 1.12. OSFP MSA. Aug. 1, 2017. 53 pages.
[No Author Listed], OSFP MSA Specification for OSFP Octal Small Form Factor Pluggable Module. Revision 2.0 OSFP MSA. Jan. 14, 2019. 80 pages.
[No Author Listed], OSFP MSA Specification for OSFP Octal Small Form Factor Pluggable Module. Revision 3.0 OSFP MSA. Mar. 14, 2020. 99 pages.
[No Author Listed], Photograph of Molex Connector. Oct. 2021. 1 page.
[No Author Listed], Photograph of TE Connector. Oct. 2021. 1 page.
[No Author Listed], Pluggable Form Products. Tyco Electronics. Mar. 5, 2006. 1 page.
[No Author Listed], Pluggable Input/Output Solutions. Tyco Electronics Catalog 1773408-1. Revised Feb. 2009. 40 pages.
[No Author Listed], QSFP Market Evolves, First Products Emerge. Lightwave. Jan. 22, 2008. pp. 1-8. https://www.lightwaveonline.com/home/article/16662662.
[No Author Listed], QSFP-DD Hardware Specification for QSFP Double Density 8X Pluggable Transceiver, Rev 3.0. QSFP-DD MSA. Sep. 19, 2017. 69 pages.
[No Author Listed], QSFP-DD Hardware Specification for QSFP Double Density 8X Pluggable Transceiver, Rev 4.0. QSFP-DD MSA. Sep. 18, 2018. 68 pages.
[No Author Listed], QSFP-DD MSA QSFP-DD Hardware Specification for QSFP Double Density 8X Pluggable Transceiever. Revision 5.0. QSFP-DD-MSA. Jul. 9, 2019. 82 pages.
[No Author Listed], QSFP-DD MSA QSFP-DD Hardware Specification for QSFP Double Density 8X Pluggable Transceiver. Revision 5.1. QSFP-DD MSA. Aug. 7, 2020. 84 pages.
[No Author Listed], QSFP-DD MSA QSFP-DD Specification for QSFP Double Density 8X Pluggable Transceiver. Revision 1.0. QSFP-DD-MSA. Sep. 15, 2016. 69 pages.
[No Author Listed], QSFP-DD Specification for QSFP Double Density 8X Pluggable Transceiver Specification, Rev. 2.0. QSFP-DD MSA. Mar. 13, 2017. 106 pages.
[No Author Listed], RTP Company Introduces "Smart" Plastics for Bluetooth Standard. Press Release. RTP. Jun. 4, 2001. 2 pages.
[No Author Listed], RTP Company Specialty Compounds. RTP. Mar. 2002. 2 pages.
[No Author Listed], RTP Company-EMI/RFI Shielding Compounds (Conductive) Data Sheets. RTP Company. Last accessed Apr. 30, 2021. 4 pages.
[No Author Listed], Samtec Board Interface Guide. Oct. 2002. 253 pages.
[No Author Listed], SFF Committee SFF-8079 Specification for SFP Rate and Application Selection. Revision 1.7. SFF Committee. Feb. 2, 2005. 21 pages.
[No Author Listed], SFF Committee SFF-8089 Specification for SFP (Small Formfactor Pluggable) Rate and Application Codes. Revision 1.3. SFF Committee. Feb. 3, 2005. 18 pages.
[No Author Listed], SFF Committee SFF-8436 Specification for QSFP+ 4X 10 GB/s Pluggable Transceiver. Revision 4.9. SFF Committee. Aug. 31, 2018. 88 pages.
[No Author Listed], SFF Committee SFF-8665 Specification for QSFP+ 28 GB/s 4X Pluggable Transceiver Solution (QSFP28). Revision 1.9. SFF Committee. Jun. 29, 2015. 14 pages.
[No Author Listed], SFF-8075 Specification for PCI Card Version of SFP Cage. Rev 1.0. SFF Committee. Jul. 3, 2001. 11 pages.
[No Author Listed], SFF-8431 Specifications for Enhanced Small Form Factor Pluggable Module SFP+. Revision 4.1. SFF Committee. Jul. 6, 2009. 132 pages.

(56) References Cited

OTHER PUBLICATIONS

[No Author Listed], SFF-8432 Specification for SFP+ Module and Cage. Rev 5.1. SFF Committee. Aug. 8, 2012. 18 pages.
[No Author Listed], SFF-8433 Specification for SFP+ Ganged Cage Footprints and Bezel Openings. Rev 0.7. SFF Committee. Jun. 5, 2009. 15 pages.
[No Author Listed], SFF-8477 Specification for Tunable XFP for ITU Frequency Grid Applications. Rev 1.4. SFF Committee. Dec. 4, 2009. 13 pages.
[No Author Listed], SFF-8672 Specification for QSFP+ 4x 28 GB/s Connector (Style B). Revision 1.2. SNIA. Jun. 8, 2018. 21 pages.
[No Author Listed], SFF-8679 Specification for QSFP+ 4X Base Electrical Specification. Rev 1.7. SFF Committee. Aug. 12, 2014. 31 pages.
[No Author Listed], SFF-8682 Specification for QSFP+ 4X Connector. Rev 1.1. SNIA SFF TWG Technology Affiliate. Jun. 8, 2018. 19 pages.
[No Author Listed], Shielding Theory and Design. Laird Technologies. Last accessed Apr. 30, 2021. 1 page.
[No Author Listed], Shielding Theory and Design. Laird Technologies. Last accessed Apr. 30, 2021. 2 pages. URL:web.archive.org/web/20030226182710/http://www.lairdtech.com/catalog/staticdata/shieldingtheorydesign/std_3.htm.
[No Author Listed], Shielding Theory and Design. Laird Technologies. Last accessed Apr. 30, 2021. 2 pages. URL:web.archive.org/web/20021223144443/http://www.lairdtech.com/catalog/staticdata/shieldingtheorydesign/std_2.htm.
[No Author Listed], Signal Integrity—Multi-Gigabit Transmission Over Backplane Systems. International Engineering Consortium. 2003;1-8.
[No Author Listed], Signal Integrity Considerations for 10Gbps Transmission over Backplane Systems. DesignCon2001. Teradyne Connections Systems, Inc. 2001. 47 pages.
[No Author Listed], Specification for OSFP Octal Small Form Factor Pluggable Module. Rev 1.0. OSFP MSA. Mar. 17, 2017. 53 pages.
[No Author Listed], TB-2092 GbX Backplane Signal and Power Connector Press-Fit Installation Process. Teradyne. Aug. 8, 2002;1-9.
[No Author Listed], Teradyne Beefs Up High-Speed GbX Connector Platform. EE Times. Sep. 20, 2005. 3 pages.
[No Author Listed], Teradyne Connection Systems Introduces the GbX L-Series Connector. Press Release. Teradyne. Mar. 22, 2004. 5 pages.
[No Author Listed], Teradyne Schematic, Daughtercard Connector Assembly 5 Pair GbX, Drawing No. C-163-5101-500. Nov. 6, 2002. 1 page.
[No Author Listed], Tin as a Coating Material. Brush Wellman Engineered Materials. Jan. 2002;4(2). 2 pages.
[No Author Listed], Two and Four Pair HM-Zd Connectors. Tyco Electronics. Oct. 14, 2003;1-8.
[No Author Listed], Tyco Electronics Schematic, Header Assembly, Right Angle, 4 Pair HMZd, Drawing No. C-1469048. Jan. 10, 2002. 1 page.
[No Author Listed], Tyco Electronics Schematic, Receptacle Assembly, 2 Pair 25mm HMZd, Drawing No. C-1469028. Apr. 24, 2002. 1 page.
[No Author Listed], Tyco Electronics Schematic, Receptacle Assembly, 3 Pair 25mm HMZd, Drawing No. C1469081. May 13, 2002. 1 page.
[No Author Listed], Tyco Electronics Schematic, Receptacle Assembly, 4 Pair HMZd, Drawing No. C1469001. Apr. 23, 2002. 1 page.
[No Author Listed], Tyco Electronics Z-Dok+ Connector. May 23, 2003. pp. 1-15. http://zdok.tycoelectronics.com.
[No Author Listed], Tyco Electronics, SFP System. Small Form-Factor Pluggable (SFP) System. Feb. 2001. 1 page.
[No Author Listed], Typical conductive additives—Conductive Compounds. RTP Company. https://www.rtpcompany.com/products/conductive/additives.htm. Last accessed Apr. 30, 2021. 2 pages.
[No Author Listed], Z-Pack HM-Zd Connector, High Speed Backplane Connectors. Tyco Electronics. Catalog 1773095. 2009;5-44.
[No Author Listed], Z-Pack HM-Zd: Connector Noise Analysis for XAUI Applications. Tyco Electronics. Jul. 9, 2001. 19 pages.
Atkinson et al., High Frequency Electrical Connector, U.S. Appl. No. 15/645,931, filed Jul. 10, 2017.
Beaman, High Performance Mainframe Computer Cables. 1997 Electronic Components and Technology Conference. 1997;911-7.
Chung, Electrical applications of carbon materials. J. of Materials Science. 2004;39:2645-61.
Dahman, Recent Innovations of Inherently Conducting Polymers for Optimal (106-109 Ohm/Sq) ESD Protection Materials. RTD Company. 2001. 8 pages.
Do et al., A Novel Concept Utilizing Conductive Polymers on Power Connectors During Hot Swapping in Live Modular Electronic Systems. IEEE Xplore 2005; downloaded Feb. 18, 2021;340-345.
Eckardt, Co-Injection Charting New Territory and Opening New Markets. Battenfeld GmbH. Journal of Cellular Plastics. 1987;23:555-92.
Elco, Metral® High Bandwidth—A Differential Pair Connector for Applications up to 6 GHz. FCI. Apr. 26, 1999;1-5.
Feller et al., Conductive polymer composites: comparative study of poly(ester)-short carbon fibres and poly(epoxy)-short carbon fibres mechanical and electrical properties. Materials Letters. Feb. 21, 2002;57:64-71.
Getz et al., Understanding and Eliminating EMI in Microcontroller Applications. National Semiconductor Corporation. Aug. 1996. 30 pages.
Grimes et al., A Brief Discussion of EMI Shielding Materials. IEEE. 1993:217-26.
Housden et al., Moulded Interconnect Devices. Prime Faraday Technology Watch. Feb. 2002. 34 pages.
Liu et al., High Speed Electrical Connector, U.S. Appl. No. 17/968,142, filed Oct. 18, 2022.
McAlexander, CV of Joseph C. McAlexander III . Exhibit 1009. 2021. 31 pages.
McAlexander, Declaration of Joseph C. McAlexander III in Support of Petition for Inter Partes Review of U.S. Pat. No. 10,381,767. Exhibit 1002. Nov. 4, 2021. 85 pages.
Nadolny et al., Optimizing Connector Selection for Gigabit Signal Speeds. Sep. 2000. 5 pages.
Neelakanta, Handbook of Electromagnetic Materials: Monolithic and Composite Versions and Their Applications. CRC. 1995. 246 pages.
Okinaka, Significance of Inclusions in Electroplated Gold Films for Electronics Applications. Gold Bulletin. Aug. 2000;33(4):117-127.
OTT, Noise Reduction Techniques in Electronic Systems. Wiley. Second Edition. 1988. 124 pages.
Patel et al., Designing 3.125 Gbps Backplane System. Teradyne. 2002. 58 pages.
Preusse, Insert Molding vs. Post Molding Assembly Operations. Society of Manufacturing Engineers. 1998. 8 pages.
Reich et al., Microwave Theory and Techniques. Boston Technical Publishers, Inc. 1965;182-91.
Ross, Focus on Interconnect: Backplanes Get Reference Designs. EE Times. Oct. 27, 2003 [last accessed Apr. 30, 2021]. 4 pages.
Ross, GbX Backplane Demonstrator Helps System Designers Test High-Speed Backplanes. EE Times. Jan. 27, 2004 [last accessed May 5, 2021]. 3 pages.
Shi et al., Improving Signal Integrity in Circuit Boards by Incorporating Absorbing Materials. 2001 Proceedings. 51st Electronic Components and Technology Conference, Orlando FL. 2001:1451-56.
Silva et al., Conducting Materials Based on Epoxy/Graphene Nanoplatelet Composites With Microwave Absorbing Properties: Effect of the Processing Conditions and Ionic Liquid. Frontiers in Materials. Jul. 2019;6(156):1-9. doi: 10.3389/fmats.2019.00156.
Tracy, Rev. 3.0 Specification IP (Intellectual Property). Mar. 20, 2020. 8 pages.
Violette et al., Electromagnetic Compatibility Handbook. Van Nostrand Reinhold Company Inc. 1987. 229 pages.

(56) References Cited

OTHER PUBLICATIONS

Wagner et al., Recommended Engineering Practice to Enhance the EMI/EMP Immunity of Electric Power Systems. Electric Research and Management, Inc. Dec. 1992. 209 pages.
Weishalla, Smart Plastic for Bluetooth. RTP Imagineering Plastics. Apr. 2001. 7 pages.
White, A Handbook on Electromagnetic Shielding Materials and Performance. Don Whie Consultants. 1998. Second Edition. 77 pages.
White, EMI Control Methodology and Procedures. Don White Consultants, Inc. Third Edition 1982. 22 pages.
Williams et al., Measurement of Transmission and Reflection of Conductive Lossy Polymers at Millimeter-Wave Frequencies. IEEE Transactions on Electromagnetic Compatibility. Aug. 1990;32(3):236-240.
U.S. Appl. No. 18/318,890, filed May 17, 2023, Zeng.
U.S. Appl. No. 18/335,472, filed Jun. 15, 2023, Cartier et al.
U.S. Appl. No. 18/449,520, filed Aug. 14, 2023, Milbrand et al.
U.S. Appl. No. 18/465,351, filed Sep. 12, 2023, Johnescu et al.
TW 111149147, Nov. 9, 2023, Taiwanese Office Action.

* cited by examiner

CONNECTOR CONFIGURABLE FOR HIGH PERFORMANCE

RELATED APPLICATIONS

This application is a continuation of U.S. application Ser. No. 17/164,400, filed Feb. 1, 2021, entitled "CONNECTOR CONFIGURABLE FOR HIGH PERFORMANCE", which is a continuation of U.S. patent application Ser. No. 16/716,157, filed on Dec. 16, 2019, entitled "CONNECTOR CONFIGURABLE FOR HIGH PERFORMANCE," which is a continuation of U.S. patent application Ser. No. 16/362,541, filed on Mar. 22, 2019, entitled "CONNECTOR CONFIGURABLE FOR HIGH PERFORMANCE," which is a continuation of U.S. patent application Ser. No. 15/683,199, filed on Aug. 22, 2017, entitled "CONNECTOR CONFIGURABLE FOR HIGH PERFORMANCE," which claims priority to and the benefit under 35 U.S.C. § 119(e) of U.S. Provisional Patent Application No. 62/378,244, filed on Aug. 23, 2016, entitled "CONNECTOR CONFIGURABLE FOR HIGH PERFORMANCE." The entire contents of the foregoing applications are hereby incorporated herein by reference in their entirety.

BACKGROUND

This patent application relates generally to electrical connectors that may be configured to carry high frequency signals.

Electrical connectors are used in many electronic systems. It is generally easier and more cost effective to manufacture a system as separate electronic assemblies, such as printed circuit boards ("PCBs"), which may be joined together with electrical connectors. A known arrangement for joining several printed circuit boards within a single enclosure is to have one printed circuit board serve as a backplane. Other printed circuit boards, called "daughterboards" or "daughtercards," may be connected through the backplane. Connectors designed for this connecting daughtercards and backplanes are widely used.

Some electronic systems are assembled with electronic components in different enclosures. Those enclosures may be connected with cables, which may be optical fiber cables but more commonly contain electrically conducting wires for conveying electrical signals. To facilitate easy assembly of the system, the cables may be terminated with cable connectors, sometimes called plugs. The plug is designed to mate with a corresponding connector, sometimes called a receptacle connector, attached to a printed circuit board inside an enclosure of an electronic device. A receptacle connector may have one or more ports that are designed to be exposed in a panel of the enclosure. Typically, a plug can be inserted into each port.

To facilitate manufacture of different portions of electronic system in different places by different companies, aspects of the receptacle connectors and the plug connectors may be standardized, either through a formal standard setting process or through adoption of a particular design by a large number of manufacturers. An example of a standard is referred to as SAS. As another example, several such standards exist as a result and are referred generally to "small form factor pluggable" (SFP) connectors. Variations of these standards exist under names such as SFP, QSFP, QSFP+, etc.

Different standards have been developed as electronic systems generally have gotten smaller, faster, and functionally more complex. The different standards allow for different combinations of speed and density within a connector system.

For standards that require a high density, high speed connector, techniques may be used reduce interference between conductive elements within the connectors, and to otherwise provide desirable electrical properties. One such technique involves the use of shield members between or around adjacent signal conductors. The shields may prevent signals carried on one conductive element from creating "crosstalk" on another conductive element. The shield may also impact the impedance of each conductive element, which may further contribute to desirable electrical properties of the connector system.

Another technique that may be used to control the performance of a connector entails transmitting signals differentially. Differential signals are carried on a pair of conducting paths, called a "differential pair." The voltage difference between the conductive paths represents the signal. In general, a differential pair is designed with preferential coupling between the conducting paths of the pair. For example, the two conducting paths of a differential pair may be arranged to run closer to each other than to adjacent signal paths in the connector.

Amphenol Corporation also pioneered the use of "lossy" material in connectors to improve performance, particularly of high speed, high density connectors.

SUMMARY

According to one aspect of the present application, an electrical connector comprises a first subassembly comprising a first plurality of conductive elements disposed in a first row, each conductive element of the first plurality having a mating contact portion, a contact tail and an intermediate portion connecting the mating contact portion and the contact tail. The electrical connector also comprises a second subassembly comprising a second plurality of conductive elements disposed in a second row, each conductive element of the second plurality having a mating contact portion, a contact tail and an intermediate portion connecting the mating contact portion and the contact tail. A member may be disposed between the first subassembly and the second subassembly, the member comprising lossy material and a plurality of conductive, compliant members extending from the lossy material. The conductive compliant members of the plurality of conductive compliant members make contact with a portion of conductive elements of the first plurality of conductive elements and a portion of the conductive elements of the second plurality of conductive elements.

In a further aspect, an electrical connector may comprise a plurality of conductive elements disposed in at least one row, each conductive element of the plurality having a mating contact portion, a contact tail and an intermediate portion connecting the mating contact portion and the contact tail. The connector may also comprise a member comprising an electrically lossy body elongated in a direction parallel to the row; and a plurality of conductive, compliant members extending from the lossy body. The conductive compliant members may make contact with a portion of the plurality of conductive elements.

In yet another aspect, an electrical connector configured as a receptacle for a plug of a cable assembly may comprise an insulative housing comprising at least one cavity configured to receive the plug, the cavity comprising a first surface and a second surface, opposing the first surface; a first plurality of conductive elements, each having a portion disposed along the first surface; a second plurality of conductive elements, each having a portion disposed along the second surface; and a member disposed within the housing, the member comprising lossy material and a plurality of conductive members extending from the lossy material. Conductive members of the plurality of conductive members may make contact with a portion of the conductive elements of the first plurality of conductive elements and a portion of the conductive elements of the second plurality of conductive elements.

The foregoing is a non-limiting summary of the invention, which is defined only by the appended claims.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION

Figure 1:
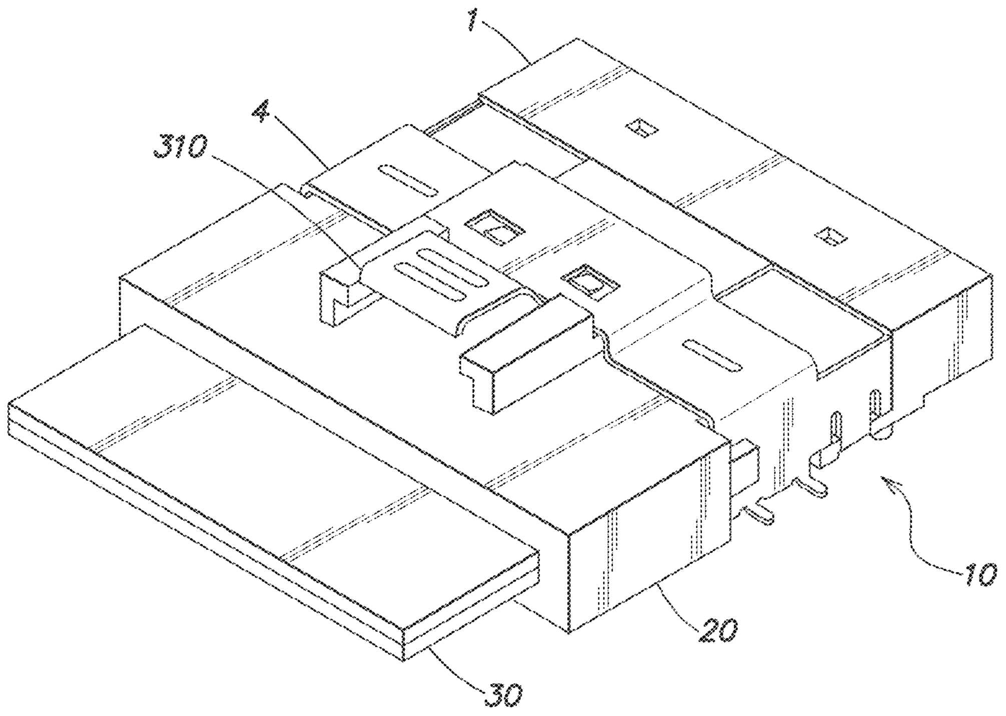
FIG. 1 is a perspective view of a receptacle connector according to some embodiments, shown mated to a complementary plug connector (in phantom)

The inventors have recognized and appreciated that that the utility of an electrical connector may be substantially improved by configuring the connector to receive a member that includes both lossy material and conductive members. The conductive members may extend from one or more surfaces of the lossy material. Some or all of the conductive members may be electrically connected, such as through a conductive web embedded in the lossy material or through the lossy material itself. Accordingly the member may act as a shorting member, shorting together structures contacting the conductive members.

The conductive members may make electrical connections with the conductive elements within the connector. The conductive members may be aligned with conductive elements positioned to act as ground conductors. When the shorting member is installed in the connector, the combined action of the conductive members and the lossy material may reduce resonances involving the conductive elements within the connector.

When the connector operates at a higher frequency (e.g., 25 GHz, 30 GHz, 35 GHz, 40 GHz, 45 GHz, etc.), the shorting member may be installed. When installed, the shorting member may reduce resonances at frequencies that are at a high frequency portion of a desired operating range of the connector, thereby enabling operation in the high frequency portion and increasing the operating range of the connector. For applications that do not require operation at frequencies in the high frequency potion of the operating range, the shorting member may be omitted, providing a lower cost connector configuration.

To support selective inclusion of the shorting member in the connector the housing may have a cavity or other features shaped to receive the shorting member. The conductive members of the shorting member may be compliant such that they can be compressed when inserted in the connector. Compression of the conductive, complaint members may generate a spring force to make a reliable electrical connection between the conductive compliant members and the conductive elements within the connector.

Isolative portions of the connector housing may be shaped to receive the shorting member and to expose portions of conductive elements so that contact may be made between the conductive elements and the conductive members of the shorting member. In some embodiments, the conductive elements of the connector may have mating contact portions, configured for mating with a complementary connector, and contact tails, configured for attachment to a printed circuit board. The conductive elements may further have intermediate portions joining the contact tails and the mating contact portions. The housing may be configured to expose a portion of the intermediate portions of at least those conductive elements designed as ground contacts for contact with the conductive members of the shorting member.

In accordance with some embodiments, the conductive elements of the connector may be organized in rows. The conductive members extending from the shorting member may be positioned to contact selective ones of the conductive elements in at least one row. In some embodiments, conductive members may extend from two opposing surfaces of the lossy portion of the shorting member. Such a configuration may enable the conductive members to contact conductive elements in two adjacent rows. In such a configuration, the shorting member may be elongated in a direction parallel to the row and may be configured as a shorting bar.

In accordance with some embodiments, the connector may be a receptacle connector. A receptacle, for example, may have a port shaped to receive a paddle card of a mating electrical connector. Mating contact portions of the conductive elements of the receptacle may line two opposing surfaces of the port, forming two adjacent rows of conductive elements. In some embodiments, the conductive elements in each row may be formed as a separate subassembly, such as by molding an insulative portion around a lead frame comprising the row of conductive elements. The shorting member may be lodged between the subassemblies, with the conductive members of the shorting member making electrical connection with selective ones of the conductive element in each row.

Turning to FIG. 1, an exemplary embodiment of a connector that may be selectively configured with a shorting member as described herein is illustrated. In this example, the connector is a receptacle connector 10, of the type known in the art to be attached to a printed circuit board. A printed circuit board may include ground planes and signal traces connected to pads on the surface of the printed circuit board. Receptacle connector 10 may include conductive elements with contact tails that may be attached to pads on the printed circuit board. Any suitable attachment technique may be used, including those known in the art. For example, in the embodiment illustrated, the contact tails are configured for attachment to a printed circuit board using a surface mount solder technique.

In the example shown, the receptacle connector 10 includes a housing 1. Housing 1 may be formed of insulative material, which may be a dielectric material. In various embodiments, housing 1 may be molded or over-molded from a dielectric material such as plastic or nylon. Examples of suitable materials include, but are not limited to, liquid crystal polymer (LCP), polyphenyline sulfide (PPS), high temperature nylon or polyphenylenoxide (PPO) or polypropylene (PP). Other suitable materials may be employed, as aspects of the present disclosure are not limited in this regard.

All of the above-described materials are suitable for use as binder material in manufacturing connectors. In accordance some embodiments, one or more fillers may be included in some or all of the binder material. To form an insulative housing, the fillers may also be insulative. As a non-limiting example, thermoplastic PPS filled to 30% by volume with glass fiber may be used to form the entire connector housing or dielectric portions of the housing.

In the embodiment illustrated, housing 1 is integrally formed as a single component. In other embodiments, housing 1 may be formed as multiple components that are separately formed and then connected together.

Conductive elements inside receptacle connector 10 may be supported, directly or indirectly, by housing 1. Conductive elements may be made of metal or any other material that is conductive and provides suitable mechanical properties for conductive elements in an electrical connector. Phosphor-bronze, beryllium copper and other copper alloys are non-limiting examples of materials that may be used. The conductive elements may be formed from such materials in any suitable way, including by stamping and/or forming.

Each conductive element may have a contact tail adapted for mounting to a printed circuit board or other substrate to which receptacle connector 10 may be attached. A printed circuit board may have multiple ground planes and multiple signal traces within the printed circuit board. Conductive vias, extending perpendicularly to the surface of the printed circuit board, may enable connections between the ground planes and signal traces within the printed circuit board and the contact tails of receptacle connector 10.

Each conductive element within receptacle connector 10 may also have a mating contact at an end of the conductive element opposing the contact tail. The mating contact may be configured for contacting a corresponding conductive element in a mating connector. The mating contact and contact tail of each conductive element may be electrically connected by an intermediate portion of the conductive elements. The intermediate portion may carry signals between the contact tail and the mating contact. The intermediate portion may also be attached, directly or indirectly, to housing 1.

To make electrical connections between the printed circuit board to which receptacle connector 10 is mounted and another electronic component, a mating connector may be inserted into receptacle connector 10. The mating connector may also be attached to a substrate that supports conductive members that carry signals and ground potentials. In the embodiment illustrated, the substrate is a cable 30. Accordingly, the mating connector is plug 20. Plug 20 may be inserted into receptacle connector 10.

In this example, plug 20 terminates cable 30. Cable 30 includes multiple conductors, which may be terminated at a second end (not visible in FIG. 1) to another plug connector for insertion into another electronic assembly with a receptacle connector or otherwise connected to an electronic assembly.

Plug connector 20 may include conductive elements positioned to make mechanical and electrical contact with the conductive elements inside receptacle connector 10. As with the conductive elements in receptacle 10, the conductive elements in the plug 20 may have a mating contact and a contact tail joined by an intermediate portion. However, the conductive elements of plug 20 may be shaped differently than the conductive elements of receptacle 10. As one difference, the contact tails of the conductive elements in plug 20 may be shaped to be attached to conductors in cable 30 rather than shaped for connection to a printed circuit board. The conductive elements of plug 20 are shown in greater detail in FIG. 3, discussed below.

One or both of receptacle connector 10 and plug connector 20 may include features to hold the connectors together when mated. In the example of FIG. 1, receptacle connector 10 includes a latching clip 4 overlaying housing 1. In this example, latching clip 4 is formed of a conductive material, such as metal. Alternatively, latching clip 4 may be formed of a dielectric material, such as plastic, or other suitable material.

Plug connector 20 includes a member designed to engage with latching clip 4. In FIG. 1, latch release tab 310 is visible. Latch release tab 310 may be connected to projections 312 (FIG. 3) that engage openings 206 (FIG. 2) of latching clip four. Latching tab 310 may be formed of the springy material, such as metal. When latch tab 310 is depressed, projections 312 (FIG. 3) may move out of engagement with openings 206, allowing the plug 20 to be pulled out of receptacle 10. Conversely, when latch tab 310 is released, the spring motion of latch tab 310 may urge projections 312 into engagement with openings 206, preventing plug 20 from being pulled out of receptacle 10.

Figure 2:
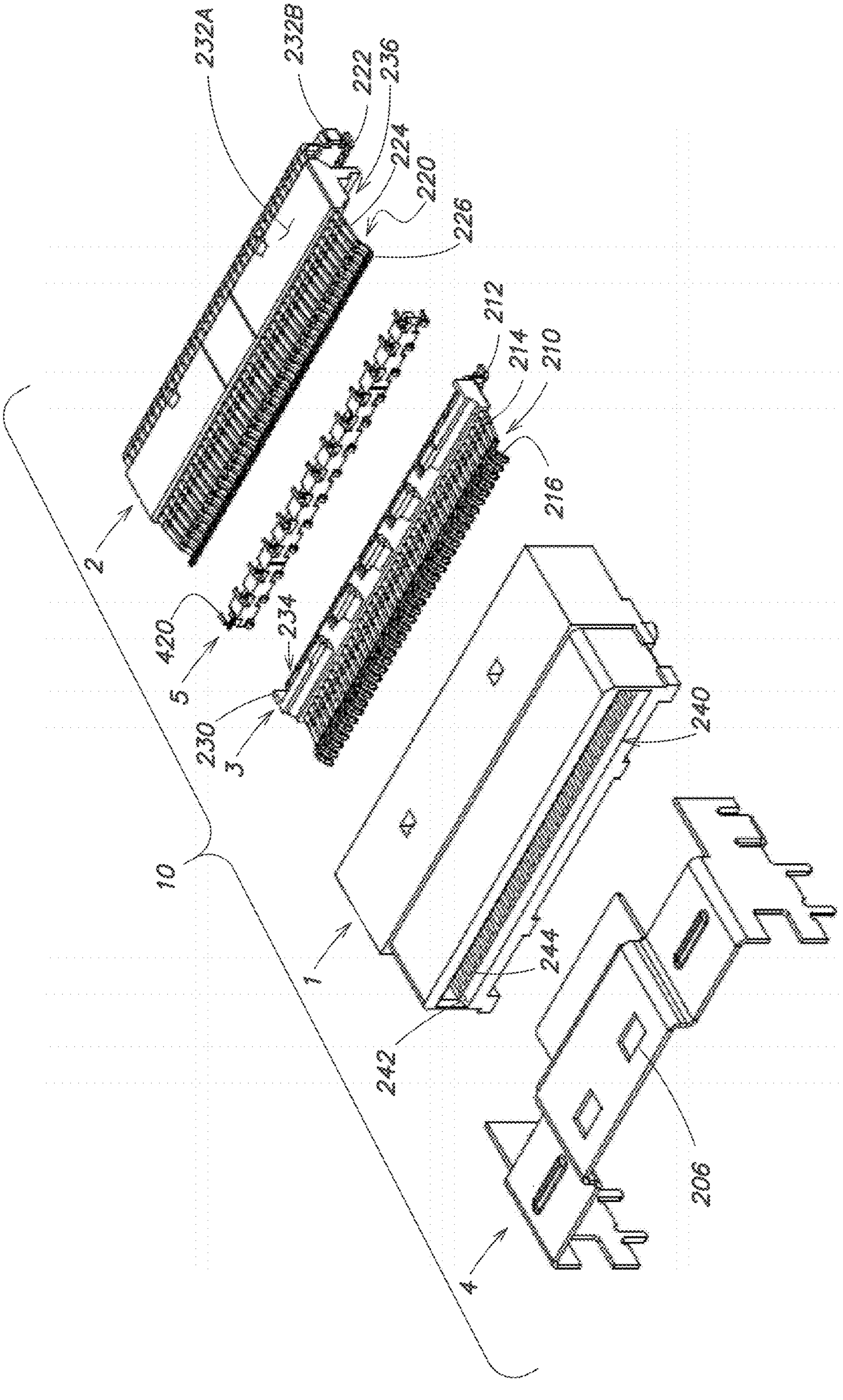
FIG. 2 is an exploded view of the receptacle connector of FIG. 1.

FIG. 2 shows an exploded view of receptacle connector 10. In the example of FIG. 2, housing 1 includes a cavity 240, forming a portion of the mating interface of receptacle connector 10. Cavity 240 may form one port of the receptacle connector. Cavity 240 has a lower surface of 242 and an upper surface (not visible in FIG. 2). Each of these surfaces includes a plurality of parallel channels, of which channel 244 is numbered. Each of the channels is configured to receive a mating contact of a conductive element.

In the embodiment of FIG. 2, the conductive elements are held together in wafers, which are inserted into housing 1. FIG. 2 shows upper contact wafer 2 and lower contact wafer 3. Each of upper contact wafer 2 and lower contact wafer 3 provides a row of conductive elements. Lower contact wafer 3 provides a row of conductive elements 210 that have mating contact portions 216 that fit with in channels 244 of lower surface 242.

Figure 3:
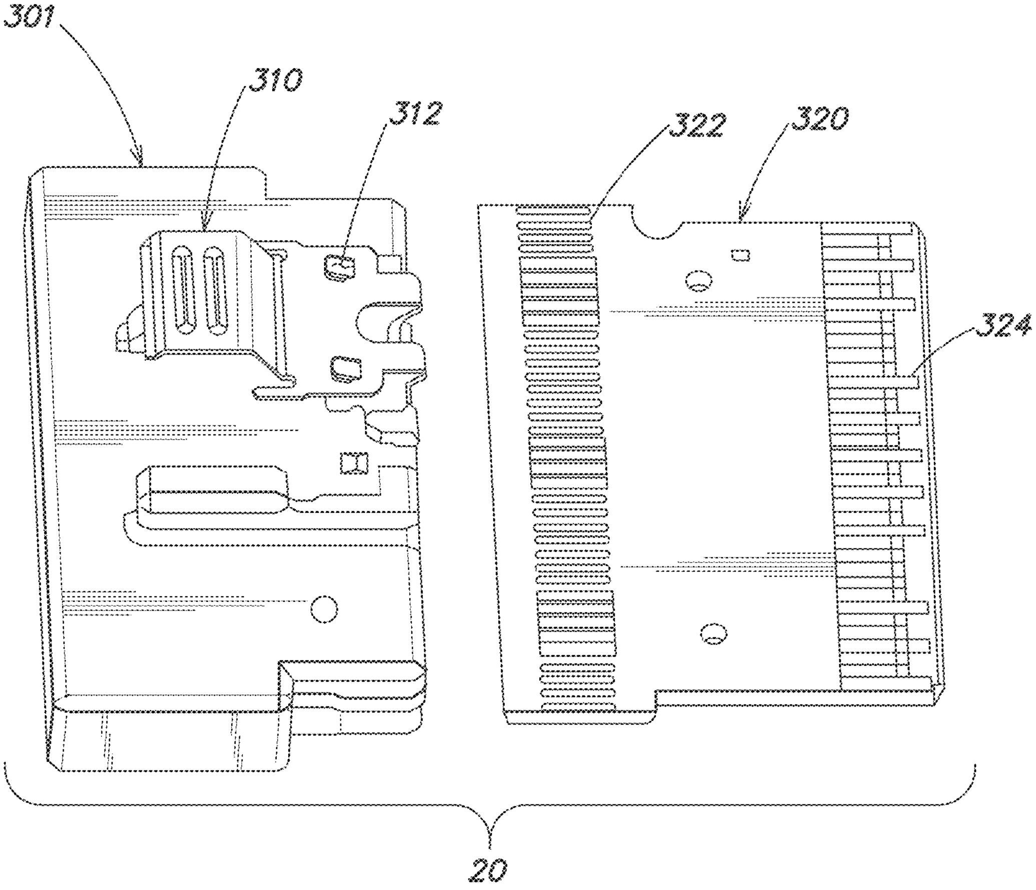
FIG. 3 is an exploded view of the plug connector of FIG. 1, without a cable attached.

In the embodiment illustrated in FIG. 2, mating contact portions 216 are shaped as compliant beams. Each of the mating contact portions 216 is curved, providing a mating contact surface on the concave side of that curve. Such a shape is suitable for mating with mating contacts that are shaped as pads. Accordingly, in the example of FIG. 2, a mating plug may contain conductive elements having mating contact portions shaped as pads, as illustrated in FIG. 3. However, it should be appreciated that the mating contact portions of receptacle 10 and plug 20 may be of any suitable size and shape that are complementary.

When lower contact wafer 3 is inserted in to housing 1, mating contact portions 216 are exposed in the lower surface 242, providing a mechanism for the conductive elements to make contact with corresponding conductive elements in plug 20 when plug 20 is inserted into cavity 240. Intermediate portions 214 extend through housing 1, allowing contact tails 212 to be exposed at a lower surface (not visible in FIG. 2) of housing 1 such that contact tails 212 may be attached to a printed circuit board.

In the embodiment illustrated, lower contact wafer 3 is formed as a subassembly, such as by molding an insulative portion 230 around the intermediate portions 214 of a row of conductive elements.

Upper contact wafer 2 has a row of conductive elements 220, and maybe formed similarly to lower contact wafer 3, with insulative portions formed around a row of conductive elements 220. The conductive elements 220 may be positioned to fit within channels in the upper surface (not visible in FIG. 2) of cavity 240. When positioned in the channels, the mating contact portions 226 of conductive elements 220 may be exposed in the upper surface of cavity 240, allowing contact with conductive elements in plug 20. The conductive elements 220 of upper contact wafer 2 similarly have intermediate portions 224 connected to contact tails 222 for attaching the conductive elements to a printed circuit board. In the example of FIG. 2, the housing of upper contact wafer 2, holding a row of conductive elements, is formed in two pieces, housing portion 232A and housing portion 232B. Each may be formed by insert molding a suitable dielectric material around the conductive elements 220 forming upper contact wafer 2.

FIG. 2 also shows shorting bar 5 that may optionally be included within receptacle connector 10. Shorting bar 5 may be included to expand the frequency range over which the interconnection system illustrated in FIG. 1 may operate. In some embodiments, conducting structures of receptacle connector 10 may support resonant modes at a fundamental frequency within a frequency range of interest for operation of the connector. In that scenario, including shorting bar 5, may alter the fundamental frequency of the resonant mode such that it occurs outside the frequency range of interest. Without the fundamental frequency of the resonant mode in the frequency range of interest, one or more performance characteristics of the connector may be at an acceptable level over the frequency range of interest while, without shorting bar 5, the performance characteristic would be unacceptable. Conversely, when performance characteristics are suitable over the frequency range of interest without shorting bar 5, shorting bar 5 may be omitted to provide a lower cost connector.

The frequency range of interest may depend on the operating parameters of the system in which such a connector is used, but may generally have an upper limit between about 15 GHz and 50 GHz, such as 25, 30 or 40 GHz, although higher frequencies or lower frequencies may be of interest in some applications. Some connector designs may have frequency ranges of interest that span only a portion of this range, such as 1 to 10 GHz or 3 to 15 GHz or 5 to 35 GHz.

The operating frequency range for an interconnection system may be defined based on the range of frequencies that pass through the interconnection with acceptable signal integrity. Signal integrity may be measured in terms of a number of criteria that depend on the application for which an interconnection system is designed. Some of these criteria may relate to the propagation of the signal along a single-ended signal path, a differential signal path, a hollow waveguide, or any other type of signal path. The criteria may be specified as a limit or range of values for performance characteristics. Two examples of such characteristics are the attenuation of a signal along a signal path or the reflection of a signal from a signal path.

Other characteristics may relate to interaction of signals on multiple distinct signal paths. Such characteristics may include, for example, near end cross talk, defined as the portion of a signal injected on one signal path at one end of the interconnection system that is measurable at any other signal path on the same end of the interconnection system. Another such characteristic may be far end cross talk, defined as the portion of a signal injected on one signal path at one end of the interconnection system that is measurable at any other signal path on the other end of the interconnection system.

As specific examples of criteria, it could be required that signal path attenuation be no more than 3 dB power loss, reflected power ratio be no greater than −20 dB, and individual signal path to signal path crosstalk contributions be no greater than −50 dB. Because these characteristics are frequency dependent, the operating range of an interconnection system is defined as the range of frequencies over which the specified criteria are met.

Designs of an electrical connector are described herein that improve signal integrity for high frequency signals, such as at frequencies in the GHz range, including up to about 25 GHz or up to about 40 GHz or higher, while maintaining high density, such as with a spacing between adjacent mating contacts on the order of 3 mm or less, including center-to-center spacing between adjacent contacts in a column of between 0.5 mm and 2.5 mm or between 0.5 mm and 1 mm, for example. As a specific example, center-to-center spacing may be 0.6 mm. The conductive elements may have a width of about 0.3-0.4 mm, leaving an edge to edge spacing between conductive elements on the order of 0.1 mm.

Shorting bar 5 may be incorporated into receptacle connector 10 by inserting shorting bar 5 into housing 1 when contact wafers 2 and 3 are inserted. As a specific example, shorting bar 5 may be positioned between upper contact wafer 2 and lower contact wafer 3 before the contact wafers are inserted into a housing 1.

Each of the contact wafers may include one or more features that secures the contact wafer in housing 1. For example, the contact wafer 3 may include a latching or other snap fit feature. Alternatively or additionally, housing 1 may include features that secure contact wafer in the housing when inserted.

Figure 4:
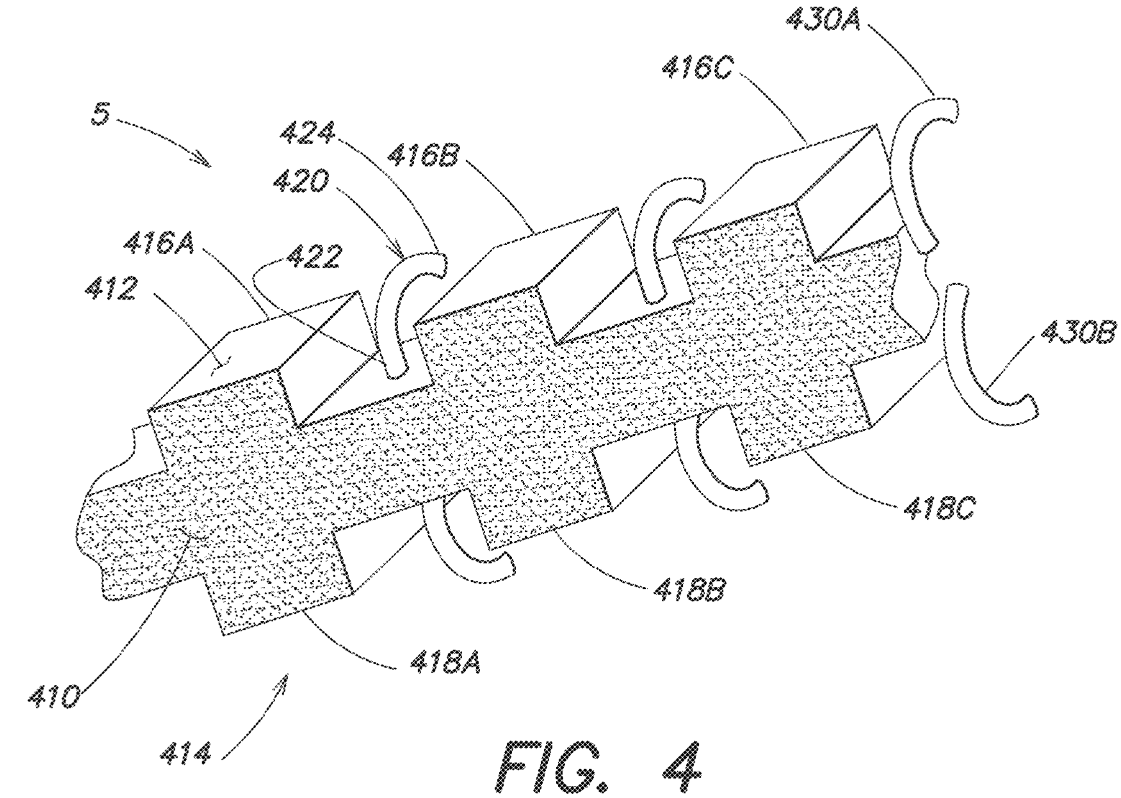
FIG. 4 is a perspective view, particularly cut away, of a first illustrative embodiment of a shorting member that may be installed in the receptacle connector of FIG. 1.

In the embodiment illustrated in FIG. 2, if used, shorting bar 5 may be held between lower contact wafer 3 and upper contact wafer 2. In the example illustrated, the rearward surface of insulative portion 230 may include openings 234. Openings 234 may be shaped to receive the shorting bar 5. As shown in FIG. 4, shorting bar 5 has a body 410 and compliant conductive members 420 extending from the body 410. The opening 234 may be shaped such that body 410 presses against the insulative portion 230. Opening 234 may further be shaped to expose intermediate portions 214 of selective ones of the conductive elements 210 in lower contact wafer 3. Compliant conductive members 420 may make contact to selective ones of the conductive elements 210. As a result of the shape of shorting bar 5 and insulative portion 230, the compliant conductive members 420 may be insulated from others of the conductive elements 210. Likewise, the body 410 may be insulated from those non-selected conductive elements 210.

Insulative portion 232A of upper contact wafer 2 may press against shorting bar 5, pressing it into insulative portion 230. With both lower contact wafer 3 and upper contact wafer 2 secured in housing 1, shorting bar 5 will also be secured within receptacle connector 10.

The surfaces of insulative portion 232A pressing against shorting bar 5 may similarly have openings 236 into which shorting bar 5 may fit. Those openings may also be shaped to expose selective ones of the mating contacts 220. The compliant conductive members 420 (FIG. 4) of the shorting bar 5 may contact the intermediate portions of selective ones of the conductive elements 220 of upper contact wafer 2. As a result of the shape of shorting bar 5 and insulative portion 232A, both the compliant conductive members 420 and body 410 of shorting bar 5 may be insulated from the non-selected conductive elements.

As described below, the selected conductive elements that are contacted by the compliant conductive members of the shorting bar 5 may be designated as ground conductors. In operation of an interconnection system, the ground conductors are intended to be connected to a conductive member of a printed circuit board or other substrate that carries a ground potential or other voltage level that serves as a reference potential for the electronic system containing the connector. Such connections have been found to increase the fundamental frequency of resonances excited within the connector, improving the frequency range over which the connector operates.

Turning to FIG. 3, further detail of a plug 20 is shown. In this example, plug 20 includes insulative housing 301. Housing 301 may be formed of the same types of materials used to form housing 1 or any other suitable material.

In this example, the conductive elements within plug connector 20 are implemented as conductive traces on printed circuit board 320, which serves as a paddle card for plug 20. Printed circuit board 320 may be a two-sided printed circuit board. Conductive traces formed on an upper surface of printed circuit board 320 may be aligned with mating contact portions 220 (FIG. 2) lining the upper surface of cavity 240 of a receptacle connector 10. Conductive traces on the lower surface of printed circuit board 320 may align with mating contact portions 216 of conductive elements lining the lower surface 244 of cavity 240.

In FIG. 3, the upper surface of printed circuit board 320 is visible with a row of contact pads 324. The contact pads 324 may be connected to traces within printed circuit board 320 and may serve as mating contacts for a first portion of the conductive elements within plug 20. A similar row of contact pads on a lower surface a printed circuit board 320 may serve as mating contacts for a second portion of the conductive elements within the plug 20. FIG. 3 shows an exploded view of plug 20. When assembled, the row of pads 324 may extend from plug housing 301, such that when printed circuit board 320 is inserted into cavity 240 (FIG. 2) the mating contact portions of the conductive elements within receptacle connector 10 press against the pads 324 on printed circuit board 320, forming conductive paths through the interconnection system formed by mating plug 20 to receptacle 10.

Printed circuit board 320 has a second row of pads 322. When plug 20 is assembled, pads 322 will be inside housing 301. The pads 322 are designed such that conductors from cable 30 (FIG. 1) may be attached to the pads. Cable conductors may be attached to pads 322 in any suitable way, such as soldering or brazing. Securing housing 301 to printed circuit board 320 may press cable 30 against printed circuit board 320, aiding in securing cable 30 to printed circuit board 320. In the example shown in FIG. 1, cable 30 has an upper and a lower portion, providing conductors to be secured to pads on the upper and lower surfaces of printed circuit board 320.

FIG. 3 also reveals additional details of latch release 310, including projections 312.

Turning to FIG. 4, additional details of shorting bar 5 are shown. Shorting bar 5 has a body 410. As can be seen in FIG. 4 viewed in conjunction with FIG. 2, body 410 is elongated parallel to the rows of conductive elements in receptacle 10.

Body 410 may have any suitable shape. In the example of FIG. 4, body 410 includes castellations 416A, 416B, 416C . . . on upper surface 412 and castellations 418A, 418B, 418C . . . on lower surface 414. Compliant conductive members 420 extend from body 410 in locations between the castellations.

In the example of FIG. 4, compliant conductive members 420 extend from an upper surface 412 and an opposing lower surface 414. As described above in connection with FIG. 2, the compliant conductive members 420 are positioned along upper surface 412 and lower surface 414 to make contact with selective ones of the conductive elements 220 of upper contact wafer 2 and conductive elements 210 of lower contact wafer 3, respectively. Compliant conductive members may be formed of any material that is suitably compliance and conductive, such as the medals mentioned above for use in forming conductive elements of receptacle 10.

The portions of compliant conductive members 420 extending from body 410 may be shaped to press against the intermediate portions of the conductive elements in upper contact wafer 2 and lower contact wafer 3 when the shorting bar 5 is installed between lower contact wafer 3 and upper contact wafer 2. In this example, compliance of a conductive member 420 may be achieved by a bend in an elongated member extending from body 410. For example, a portion 422 may extend in a direction perpendicular to a surface of body 410. That member may have a bend creating a transverse portion 424 at a distal end of conductive member 420. The bend and/or transverse portion 424 may serve as a contact for making electrical connection to a conductive element in connector 10.

Body 410 may be formed of a lossy material. Any suitable lossy material may be used. Materials that conduct, but with some loss, or material which by another physical mechanism absorbs electromagnetic energy over the frequency range of interest are referred to herein generally as "lossy" materials. Electrically lossy materials can be formed from lossy dielectric and/or poorly conductive and/or lossy magnetic materials. Magnetically lossy material can be formed, for example, from materials traditionally regarded as ferromagnetic materials, such as those that have a magnetic loss tangent greater than approximately 0.05 in the frequency range of interest. The "magnetic loss tangent" is the ratio of the imaginary part to the real part of the complex electrical permeability of the material. Practical lossy magnetic materials or mixtures containing lossy magnetic materials may also exhibit useful amounts of dielectric loss or conductive loss effects over portions of the frequency range of interest. Electrically lossy material can be formed from material traditionally regarded as dielectric materials, such as those that have an electric loss tangent greater than approximately 0.05 in the frequency range of interest. The "electric loss tangent" is the ratio of the imaginary part to the real part of the complex electrical permittivity of the material. Electrically lossy materials can also be formed from materials that are generally thought of as conductors, but are either relatively poor conductors over the frequency range of interest, contain conductive particles or regions that are sufficiently dispersed that they do not provide high conductivity or otherwise are prepared with properties that lead to a relatively weak bulk conductivity compared to a good conductor such as copper over the frequency range of interest.

Electrically lossy materials typically have a bulk conductivity of about 1 siemen/meter to about 100,000 siemens/meter and preferably about 1 siemen/meter to about 10,000 siemens/meter. In some embodiments material with a bulk conductivity of between about 10 siemens/meter and about 200 siemens/meter may be used. As a specific example, material with a conductivity of about 50 siemens/meter may be used. However, it should be appreciated that the conductivity of the material may be selected empirically or through electrical simulation using known simulation tools to determine a suitable conductivity that provides both a suitably low crosstalk with a suitably low signal path attenuation or insertion loss.

Electrically lossy materials may be partially conductive materials, such as those that have a surface resistivity between 1 Ω/square and 100,000 Ω/square. In some embodiments, the electrically lossy material has a surface resistivity between 10 Ω/square and 1000 Ω/square. As a specific example, the material may have a surface resistivity of between about 20 Ω/square and 80 Ω/square.

In some embodiments, electrically lossy material is formed by adding to a binder a filler that contains conductive particles. In such an embodiment, a lossy member may be formed by molding or otherwise shaping the binder with filler into a desired form. Examples of conductive particles that may be used as a filler to form an electrically lossy material include carbon or graphite formed as fibers, flakes, nanoparticles, or other types of particles. Metal in the form of powder, flakes, fibers or other particles may also be used to provide suitable electrically lossy properties. Alternatively, combinations of fillers may be used. For example, metal plated carbon particles may be used. Silver and nickel are suitable metal plating for fibers. Coated particles may be used alone or in combination with other fillers, such as carbon flake. The binder or matrix may be any material that will set, cure, or can otherwise be used to position the filler material. In some embodiments, the binder may be a thermoplastic material traditionally used in the manufacture of electrical connectors to facilitate the molding of the electrically lossy material into the desired shapes and locations as part of the manufacture of the electrical connector. Examples of such materials include liquid crystal polymer (LCP) and nylon. However, many alternative forms of binder materials may be used. Curable materials, such as epoxies, may serve as a binder. Alternatively, materials such as thermosetting resins or adhesives may be used.

Also, while the above described binder materials may be used to create an electrically lossy material by forming a binder around conducting particle fillers, the invention is not so limited. For example, conducting particles may be impregnated into a formed matrix material or may be coated onto a formed matrix material, such as by applying a conductive coating to a plastic component or a metal component. As used herein, the term "binder" encompasses a material that encapsulates the filler, is impregnated with the filler or otherwise serves as a substrate to hold the filler.

Preferably, the fillers will be present in a sufficient volume percentage to allow conducting paths to be created from particle to particle. For example, when metal fiber is used, the fiber may be present in about 3% to 40% by volume. The amount of filler may impact the conducting properties of the material.

Filled materials may be purchased commercially, such as materials sold under the trade name Celestran® by Celanese Corporation which can be filled with carbon fibers or stainless steel filaments. A lossy material, such as lossy conductive carbon filled adhesive preform, such as those sold by Techfilm of Billerica, Massachusetts, US may also be used. This preform can include an epoxy binder filled with carbon fibers and/or other carbon particles. The binder surrounds carbon particles, which act as a reinforcement for the preform. Such a preform may be inserted in a connector lead frame subassembly to form all or part of the housing. In some embodiments, the preform may adhere through the adhesive in the preform, which may be cured in a heat treating process. In some embodiments, the adhesive may take the form of a separate conductive or non-conductive adhesive layer. In some embodiments, the adhesive in the preform alternatively or additionally may be used to secure one or more conductive elements, such as foil strips, to the lossy material.

Various forms of reinforcing fiber, in woven or non-woven form, coated or non-coated may be used. Non-woven carbon fiber is one suitable material. Other suitable materials, such as custom blends as sold by RTP Company, can be employed, as the present invention is not limited in this respect.

However, lossy members also may be formed in other ways. In some embodiments, a lossy member may be formed by interleaving layers of lossy and conductive material such as metal foil. These layers may be rigidly attached to one another, such as through the use of epoxy or other adhesive, or may be held together in any other suitable way. The layers may be of the desired shape before being secured to one another or may be stamped or otherwise shaped after they are held together.

In the embodiment illustrated in FIG. 4, the lossy material used to form body 410 may be a polymer filled with conductive particles such that body 410 may be shaped by molding and then curing the conductive polymer. Compliant conductive members 420 may be secured to shorting bar 5 by molding the polymer over one or more conductive members from which compliant conductive members 240 extend.

Contact between the lossy material of body 410 and the compliant conductive members contacting conductive elements within the receptacle 10 damps high frequency energy, such as may result from resonances in the conductive elements. A sufficient portion of the conductive members 420 may be positioned within body 410 to provide suitable mechanical integrity to shorting bar 5 and damping of high frequency energy. FIG. 4 illustrates an embodiment in which separate conductive members 430A and 430B extend from upper surface 412 and lower surface 414 respectively.

Figure 5:
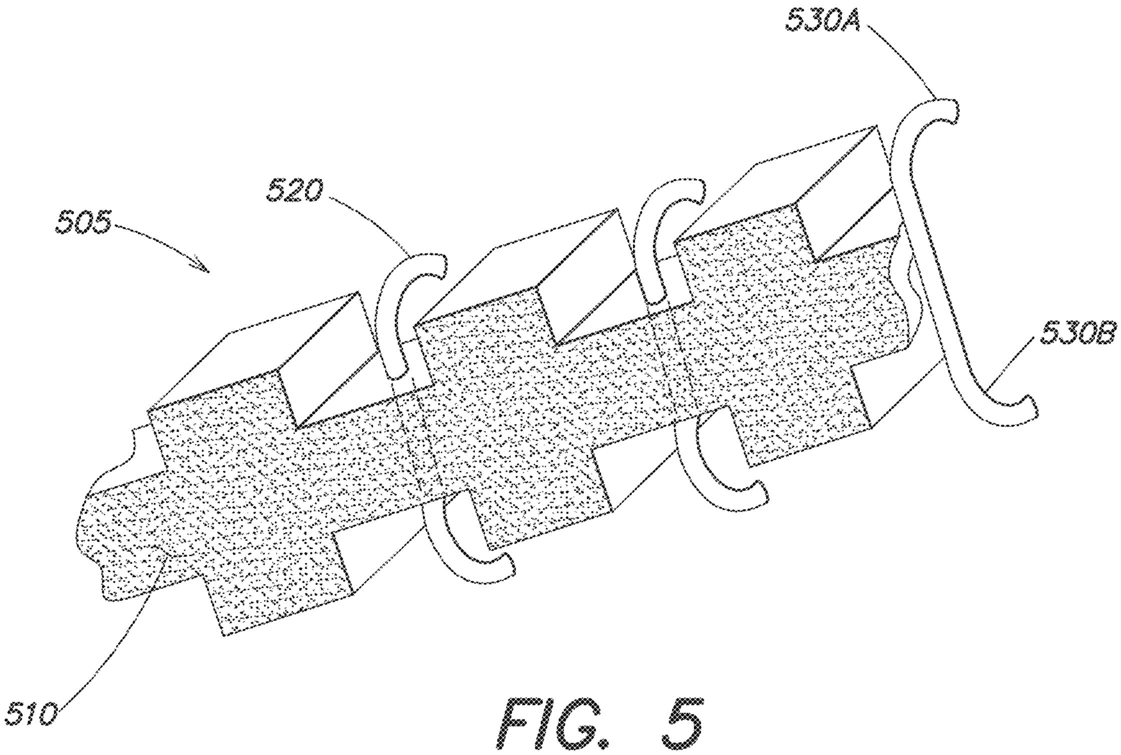
FIG. 5 is a perspective view, particularly cut away, of a second illustrative embodiment of a shorting member that may be installed in the receptacle connector of FIG. 1.

FIG. 5 illustrates an alternative embodiment of a shorting bar 505 compliant conductive members 520 may be positioned similarly to compliant conductive members 420. In this example, shorting bar 505 has a body 510 shaped similarly to body 410 (FIG. 4). Shorting bar 505 differs from the shorting bar five (FIG. 4) and similarly formed of lossy material in the shape of the conductive members 520 with in body 510. In this example, two compliant conductive members 520, extending from opposing surfaces of body 510, are opposing ends of a single conductive member. As shown in FIG. 5, that conductive member is C-shaped, with ends 530A and 530B extending from opposing surfaces of body 510. Having a conductive path between compliant conductive members may, in some embodiments, reduce resonances within the receptacle 10.

Figure 6:
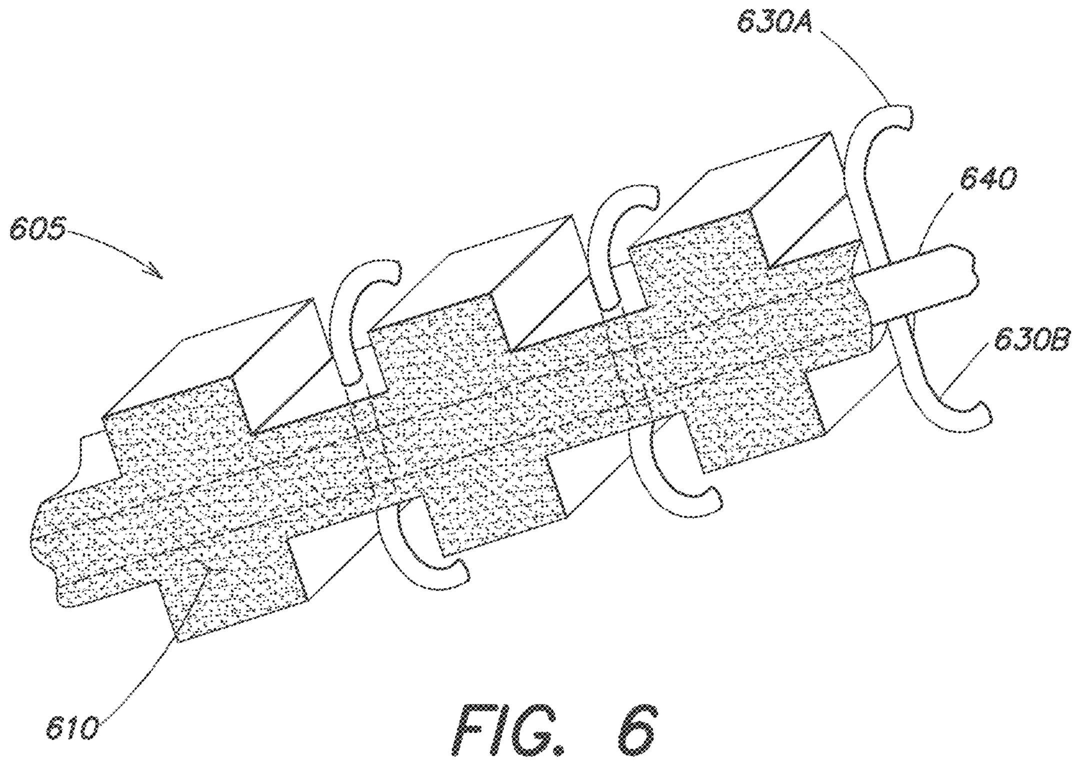
FIG. 6 is a perspective view, particularly cut away, of a third illustrative embodiment of a shorting member that may be installed in the receptacle connector of FIG. 1.

FIG. 6 shows a further alternative embodiment. Shorting bar 605 includes a body 610 also shaped similarly to body 410 and similarly formed of lossy material. The portions of complaint conductive members extending from body 610 may be shaped similarly to the extending portions shown in FIG. 4 and FIG. 5. In the example of FIG. 6, the compliant conductive members 630A and 630B's extending from opposing surfaces of body 610 are integrally formed from the same conductive member, as in FIG. 5. In addition, multiple compliant conductive members along the length of shorting bar 605 are connected together by a conductive web 640. The configuration illustrated in FIG. 6 may be formed, for example, by stamping a conductive insert from a sheet of metal. The conductive insert may include compliant conductive members extending over a portion or the full length of shorting bar 605, along with the conductive web 640 interconnecting those compliant conductive members. Body 610 may then be over molded on the insert. However, other construction techniques are possible.

In some embodiments, the connector may have assignments, reflecting an intended use of the conductive elements, and the compliant conductive members may be positioned to make contact with selective ones of the conductive elements based on their assignments. For example, pairs of adjacent conductive elements may be assigned as signal conductors intended for carrying a differential signal per pair. In some embodiments, the pairs may be separated by other conductive elements assigned as grounds. When mounted to a printed circuit board, the contact tails of these conductive elements may be attached to structures within the printed circuit board corresponding to the assigned use of the conductive elements: grounds may be attached to ground planes and signal conductors may be attached to signal traces, which may be routed in pairs, reflecting their use in carrying differential signals. The conductive members of the shorting bar may align with some or all of the conductive elements assigned as grounds.

Figure 7:
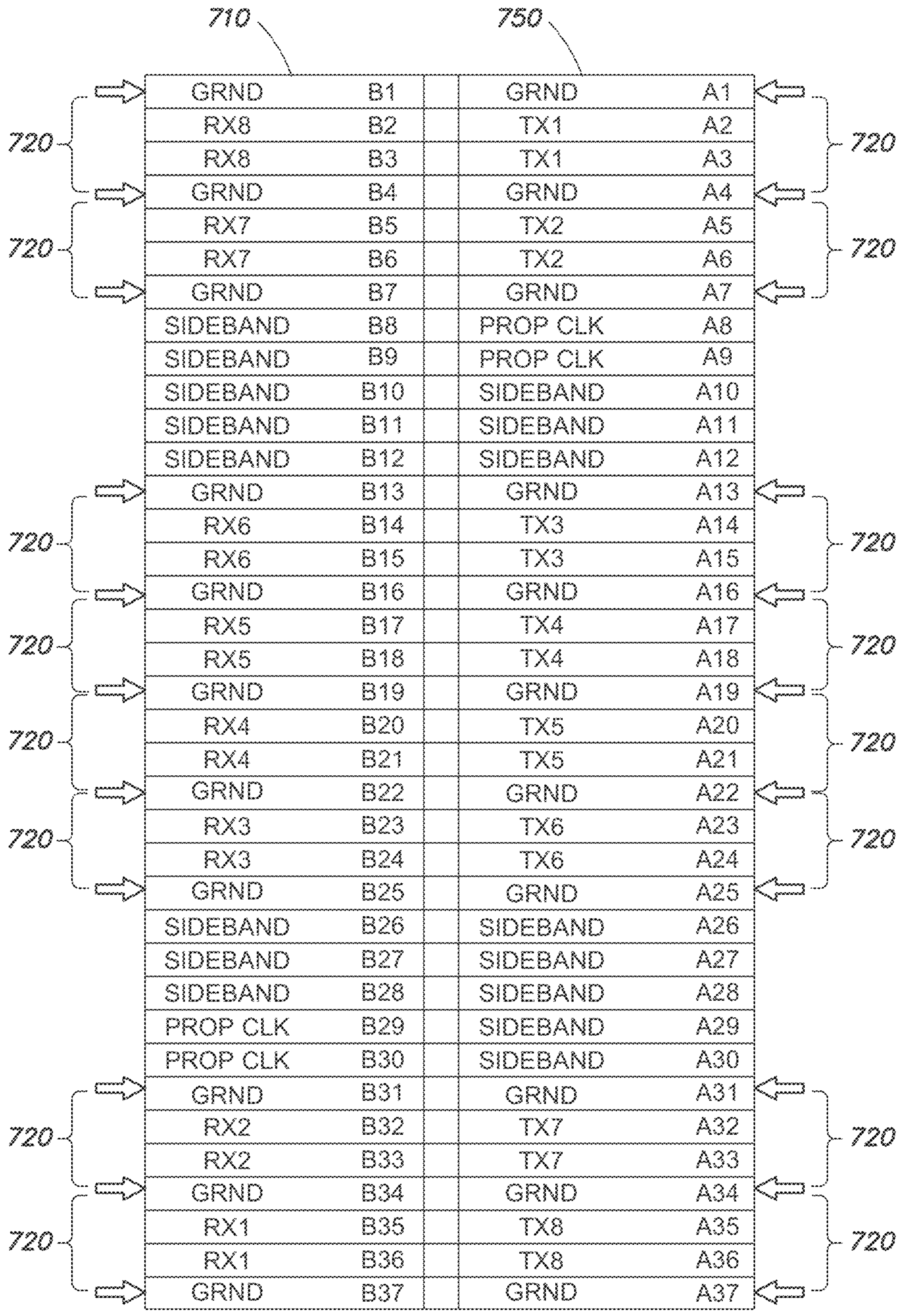
FIG. 7 is a schematic illustration of assignments of conductive elements within a connector to functions.

FIG. 7 is a schematic diagram of specific definition of the conductive elements in a receptacle connector in accordance with an embodiment. Element 710 represents assignments of conductive elements in a first row, which may be on an upper surface of a port. Element 750 represents assignments of conductive elements in a second row, which may be on an opposing, lower surface of the port.

In the illustrated example, the conductive elements are assigned to provide one pair of clock signal pins, eight sideband pins and eight pairs of differential signal pins are respectively disposed on each of the upper and lower surfaces. The differential signal pins 720 respectively disposed on the upper surface and the lower surface are symmetrical with respect to each other. As can be seen, the differential signal conductors are disposed in pairs, and each pair is positioned between ground conductors. In accordance with some embodiments, conductive members of the shorting member may contact the ground conductors, as schematically indicated by the arrows contacting conductive elements at locations B1, B4, B7, B13, B16, B19, B22, B25, B31, B34, and B37. Also, conductive members make contact at locations A1, A4, A7, A13, A16, A19, A22, A25, A31, A34, and A37. When a shorting bar is present, the connector system may support higher frequency operation on signal pairs 420 then when the shorting bars is omitted.

Each group of symmetrical differential signal pins is respectively disposed on the upper surface and the lower surface in a staggered manner. For example, RX8 pins are arranged on the upper surface at B2 and B3 PIN location and TX8 pins which are symmetrical to RX8 are disposed on the lower surface at A35 and A36 PIN location. Other signal pins that are symmetrical with respect to each other are arranged in a staggered manner similarly, allowing the near end cross-talk to be effectively reduced. The arrangement of the defined pins is not limited to the above and any arrangements in which symmetrical differential signal pins are disposed on the upper surface and the lower surface in a staggered manner fall within the scope of the disclosure.

Having thus described several aspects of at least one embodiment of this invention, it is to be appreciated that various alterations, modifications, and improvements will readily occur to those skilled in the art.

For example, it was described that conductive members of the shorting bar are in electrical connection with conductive elements acting as grounds. It should be appreciated that "ground" does not necessarily imply earth ground. Any potential acting as a reference for high speed signals may be regarded as a ground. A "ground," therefore may have a positive or negative potential relative to earth ground or, in some embodiments, may be a low frequency signal, such as a control signal that changes level infrequently.

As an example of another variation, a shorting member was pictured for use in a connector with a pattern of signal pairs, separated by ground conductors. It should be appreciated that a uniform or repeating pattern is not required and that conductive members of a shorting member need not be regularly spaced. For example, a connector may have assignments in which some conductive elements are intended for use in carrying high frequency signals and some are intended only for low frequency signals. Fewer grounds may be present near signal conductors assigned for low frequency operation than near those assigned for high frequency signals, leading to a non-uniform spacing between the conductive members.

It was described that each conductive member in a shorting member makes electrical and mechanical contact with a corresponding conductive element in a connector. It is not a requirement that the elements be in mechanical contact. If the conductive members and conductive elements are closely spaced, adequate electrical connection may result to achieve a desired improvement in electrical performance of the connector. However, the inventors have recognized and appreciate that inclusion of compliant conductive elements extending from a lossy body improves the effectiveness of the shorting member at increasing high frequency performance of the connector, particularly for a dense connector.

Further, a shorting bar was illustrated in conjunction with a receptacle connector. It should be appreciated that a shorting bar, including a lossy body and extending complaint conductive members, may alternatively or additionally be used in a plug connector or a connector of any other format, including a right angle connector, or a mezzanine connection.

Figure 8:
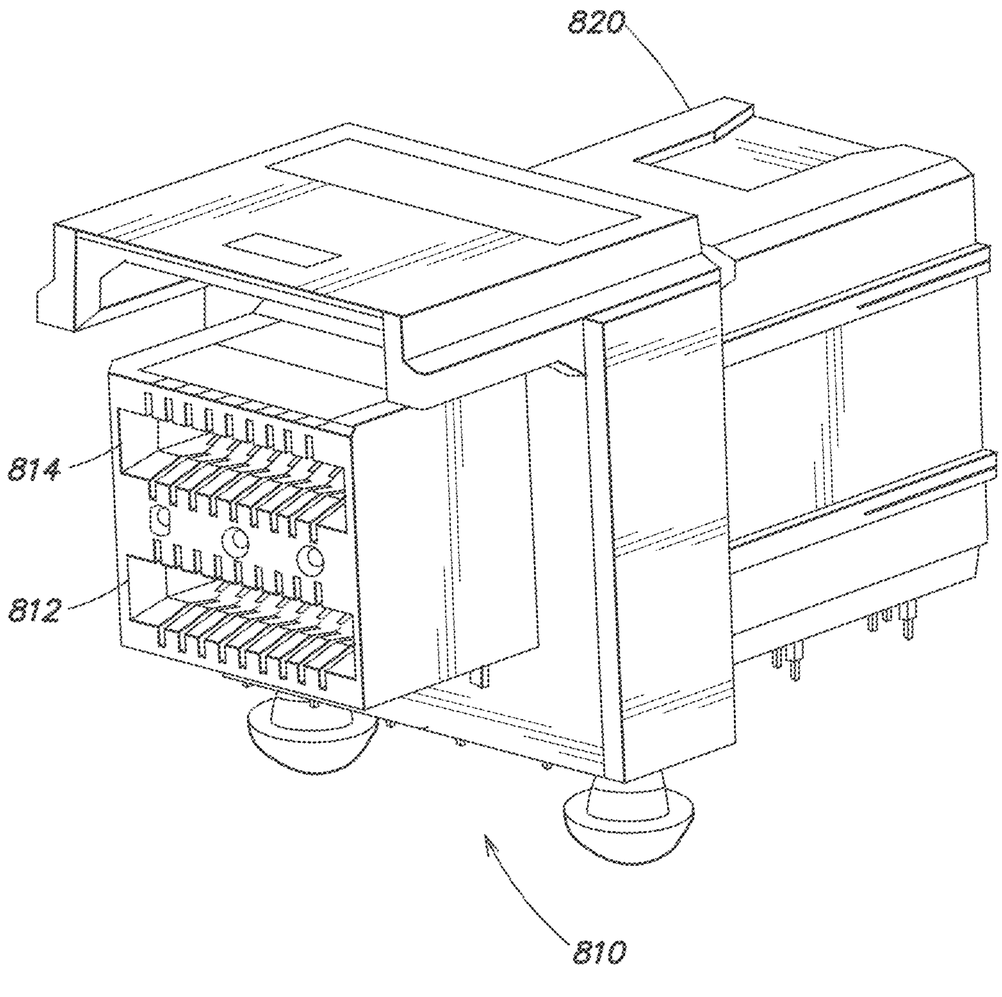
FIG. 8 is a perspective view of an embodiment of a receptacle connector with two ports, each of which may receive a shorting member as described herein.

As a further variation, it should be recognized that FIG. 1 illustrates a single port connector. Techniques as described above may be used to implement a multiport connector. FIG. 8, for example illustrates a dual port connector 810, with ports 812 and 814. A shorting bar may be associated with either or both of ports 812 and/or 814. For example, receptacle connector 810 may be formed within insulative housing 820 into which multiple contact wafers are inserted. In an embodiment in which each contact wafer includes a row of conductive elements, the two port connector illustrated in FIG. 8 may be constructed from four contact wafers, each providing a row of conductive elements for an upper or lower surface of a port 812 or 814.

As yet a further variation, a shorting bar is illustrated with conductive elements extending from two opposing surfaces so as to contact conductive elements in two parallel rows. It should be appreciated that a shorting bar may contact conductive elements in a single row or in more than two rows in some embodiments.

Moreover, it is described that a shorting bar is positioned between two parallel rows of conductive elements. It is not a requirement that the lossy member be configured as an elongated member. In some embodiments, the lossy member, positioned to electrically couple to the conductive elements in the rows may be annular, wrapping around the conductive elements. Such a lossy member may have projections adjacent ground conductors. Those projections may be compliant, such as may result from projections made of metal or a conductive elastomer. Alternatively the projections may be rigid, such as may result from molding the lossy member from a plastic material loaded with conductive fillers. Moreover, coupling between the lossy member and conductive elements intended to be connected to ground may alternatively or additionally be achieved by openings in the insulative housing between the lossy member and the ground conductive elements.

As an example of other possible configurations for the lossy member, two elongated members may be provided, one adjacent each row of conductive elements. As a further alternative, multiple lossy members may be coupled to the conductive elements of each row. As a specific example, two lossy members may each be positioned next to one half of the conductive elements in a row. However, it should be appreciated that any suitable number of lossy members each may be positioned adjacent any suitable number of conductive elements.

Other changes may be made to the illustrative structures shown and described herein. For example, techniques are described for improving signal quality at the mating interface of an electrical interconnection system. These techniques may be used alone or in any suitable combination. Furthermore, though the techniques described herein are particularly suitable for improving performance of a miniaturized connector, the size of a connector may be increased or decreased from what is shown. Also, it is possible that materials other than those expressly mentioned may be used to construct the connector.

Furthermore, although many inventive aspects are shown and described with reference to an I/O connector, and specifically a receptacle style connector, the techniques described herein may be applied in any suitable style of connector, including a daughterboard/backplane connectors having a right angle configuration, stacking connectors, mezzanine connectors, I/O connectors, chip sockets, etc.

In some embodiments, contact tails were illustrated as surface mount contacts. However, other configurations may also be used, such press fit "eye of the needle" compliant sections that are designed to fit within vias of printed circuit boards, spring contacts, solderable pins, etc., as aspects of the present disclosure are not limited to the use of any particular mechanism for attaching connectors to printed circuit boards.

Such alterations, modifications, and improvements are intended to be part of this disclosure, and are intended to be within the spirit and scope of the invention. Further, though advantages of the present invention are indicated, it should be appreciated that not every embodiment of the invention will include every described advantage. Some embodiments may not implement any features described as advantageous herein and in some instances. Accordingly, the foregoing description and drawings are by way of example only.

Various aspects of the present invention may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified.

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

What is claimed is:

1. An electrical connector configured to attach to a printed circuit board, the electrical connector comprising:

a subassembly comprising a plurality of conductive elements disposed in a row, conductive elements of the plurality of conductive elements comprising intermediate portions having segments configured to extend over a surface of the printed circuit board when the electrical connector is attached to the printed circuit board; and a shorting member disposed adjacent the subassembly, the shorting member comprising a conductive sheet, the conductive sheet comprising:

first portions making contact with the segments of a subset of conductive elements of the plurality of conductive elements; and second portions interconnecting the first portions.

2. The electrical connector of claim 1, wherein:

the first portions of the shorting member are a plurality of conductive members; and the second portions of the shorting member comprise a conductive bar interconnecting conductive members of the plurality of conductive members.

3. The electrical connector of claim 2, wherein conductive members of the plurality of conductive members have a curved shape.

4. The electrical connector of claim 2, wherein the second portions comprise a first conductive bar and a second conductive bar.

5. The electrical connector of claim 4, wherein the first conductive bar is disposed parallel to the second conductive bar.

6. The electrical connector of claim 5, wherein the first conductive bar and the second conductive bar both make electrical contact with the subset of conductive elements of the plurality of conductive elements.

7. The electrical connector of claim 1, wherein the plurality of conductive elements comprises a first plurality of conductive elements and a second plurality of conductive elements, wherein conductive elements of the first plurality of conductive elements are arranged opposite respective conductive elements of the second plurality of conductive elements along the row.

8. The electrical connector of claim 7, wherein conductive elements of the first plurality of conductive elements and of the second plurality of conductive elements comprise a mating contact portion and a contact tail, and the intermediate portions connect the mating contact portion and the contact tail.

9. The electrical connector of claim 8, further comprising a housing having a cavity with a first surface and a second, parallel surface, wherein:

the mating contact portions of the first plurality of conductive elements are adjacent to the first surface; and the mating contact portions of the second plurality of conductive elements are adjacent to the second surface.

10. The electrical connector of claim 9, wherein the first surface and the second surface are spaced apart to receive a paddle card between the first surface and the second surface.

11. An electrical connector configured to attach to a printed circuit board, the electrical connector comprising:

a subassembly comprising a plurality of conductive elements disposed in a row, conductive elements of the plurality of conductive elements comprising intermediate portions having segments configured to extend over a surface of the printed circuit board when the electrical connector is attached to the printed circuit board; and a shorting member disposed adjacent the subassembly, the shorting member comprising:

a web extending along the row; and a plurality of conductive members extending from the web and making contact with the segments of a subset of conductive elements of the plurality of conductive elements.

12. The electrical connector of claim 11, further comprising lossy material positioned adjacent the shorting member such that resonances are reduced.

13. The electrical connector of claim 12, wherein the lossy material comprises a polymer and conductive fillers.

14. The electrical connector of claim 11, wherein the subassembly comprises an insulative portion supporting the plurality of conductive elements.

15. The electrical connector of claim 14, wherein conductive members of the plurality of conductive members extend to make contact with the subset of conductive elements through openings in the insulative portion.

16. The electrical connector of claim 11, wherein the plurality of conductive elements comprises ground contacts and signal contacts.

17. The electrical connector of claim 16, wherein a first ground contact is separated from a second ground contact along the row by a pair of signal contacts.

18. The electrical connector of claim 11, wherein the subset of conductive elements comprises ground contacts.

19. The electrical connector of claim 11, wherein the electrical connector is attached to the printed circuit board, and wherein:

the printed circuit board comprises at least one ground plane; and each electrically conductive element of the subset of electrically conductive elements is electrically coupled to the at least one ground plane.

20. The electrical connector of claim 19, wherein:

the printed circuit board comprises a plurality of pairs of signal traces; and pairs of electrically conductive elements of the plurality of electrically conductive elements are each electrically coupled to a pair of the plurality of pairs of signal traces in the printed circuit board.

* * * * *